United States Patent
Rajadurai et al.

(10) Patent No.: US 12,041,448 B2
(45) Date of Patent: Jul. 16, 2024

(54) METHODS AND APPARATUS FOR CONTROLLING PERMISSIONS OF A UE FOR ACCESSING A NETWORK

(71) Applicant: Samsung Electronics Co., Ltd., Suwon-si (KR)

(72) Inventors: Rajavelsamy Rajadurai, Bangalore (IN); Kundan Tiwari, Sitamarhi (IN); Anikethan Ramakrishna Vijaya Kumar, Bengaluru (IN); Narendranath Durga Tangudu, Bengaluru (IN); Lalith Kumar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 17/766,105

(22) PCT Filed: Sep. 29, 2020

(86) PCT No.: PCT/KR2020/013356
§ 371 (c)(1),
(2) Date: Apr. 1, 2022

(87) PCT Pub. No.: WO2021/066529
PCT Pub. Date: Apr. 8, 2021

(65) Prior Publication Data
US 2022/0377548 A1 Nov. 24, 2022

(30) Foreign Application Priority Data
Oct. 1, 2019 (IN) .............................. 201941039628
Sep. 25, 2020 (IN) .............................. 2019 41039628

(51) Int. Cl.
*H04W 12/065* (2021.01)
*H04W 8/02* (2009.01)

(52) U.S. Cl.
CPC ........... *H04W 12/065* (2021.01); *H04W 8/02* (2013.01)

(58) Field of Classification Search
CPC .............................. H04W 12/065; H04W 8/02
(Continued)

(56) References Cited

U.S. PATENT DOCUMENTS

| 2008/0046963 A1* | 2/2008 | Grayson | H04L 67/61 726/1 |
| 2014/0026180 A1* | 1/2014 | Baglin | H04W 12/03 726/1 |

(Continued)

FOREIGN PATENT DOCUMENTS

| GB | 2400273 A | * 10/2004 | ............. H04L 29/06 |
| KR | 10-2019-0004217 A | 1/2019 | |

(Continued)

OTHER PUBLICATIONS

Johnstone Justin Gordon, Femtocell Network, WO 2012/098411 A1, 2012.*

(Continued)

*Primary Examiner* — Nghi H Ly
(74) *Attorney, Agent, or Firm* — Jefferson IP Law, LLP

(57) ABSTRACT

Methods and systems for controlling permissions of a UE for accessing a network. A method disclosed herein includes initiating, by a User Equipment (UE), a registration procedure with a serving network for accessing a selected network, wherein the selected network includes one of at least one CAG cell of an NPN and a VPLMN. The registration procedure indicates a network selection mode using which the UE has selected the network and the network selection mode includes one of an automatic mode and a manual mode. The method further incudes determining, by the serving network, a reject mode for rejecting the registration (Continued)

request of the UE based on the network selection mode indicated in the registration request, when the permissions of the UE to access the selected network have not been verified, wherein the reject mode includes a protected reject mode and an unprotected reject mode.

14 Claims, 10 Drawing Sheets

(58) Field of Classification Search
USPC ........ 455/411, 410, 435.1, 432.1, 422.1, 418
See application file for complete search history.

(56) References Cited

U.S. PATENT DOCUMENTS

| 2019/0007500 | A1 | 1/2019 | Kim et al. |
| 2019/0174449 | A1 | 6/2019 | Shan et al. |
| 2019/0380128 | A1* | 12/2019 | Park .................. H04W 48/20 |

FOREIGN PATENT DOCUMENTS

| KR | 10-2019-0060667 A | 6/2019 |
| WO | 2019/138133 A1 | 7/2019 |

OTHER PUBLICATIONS

3GPP; TSG SA; Study on security for 5GS enhanced support of Vertical and LAN Services; (Release 16), 3GPP TR 33.819 V1.2.0, Sep. 22, 2019.

* cited by examiner

[Fig. 1]
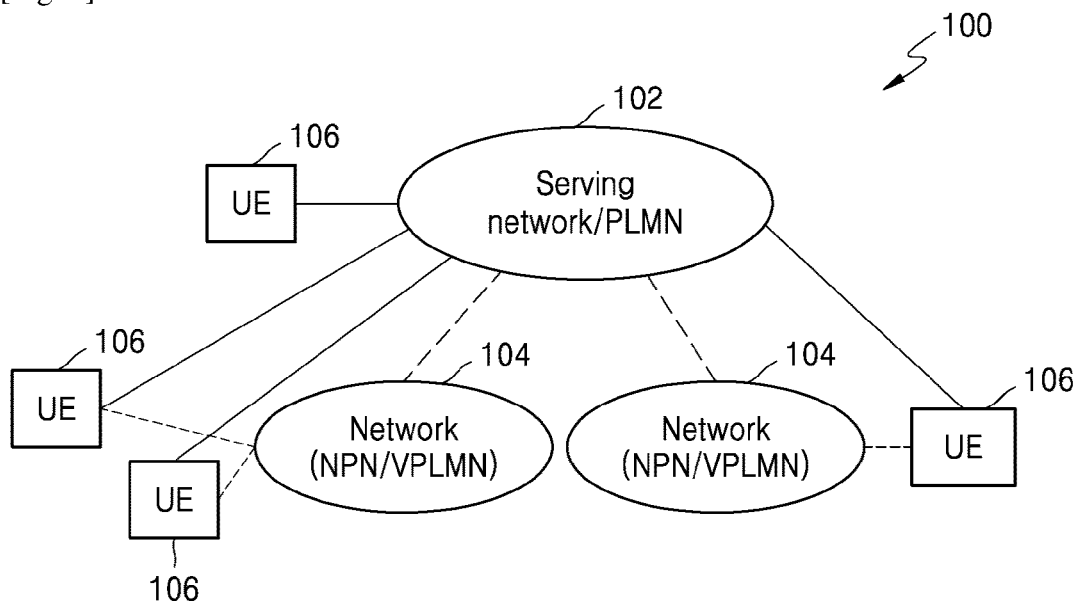
[Fig. 2]
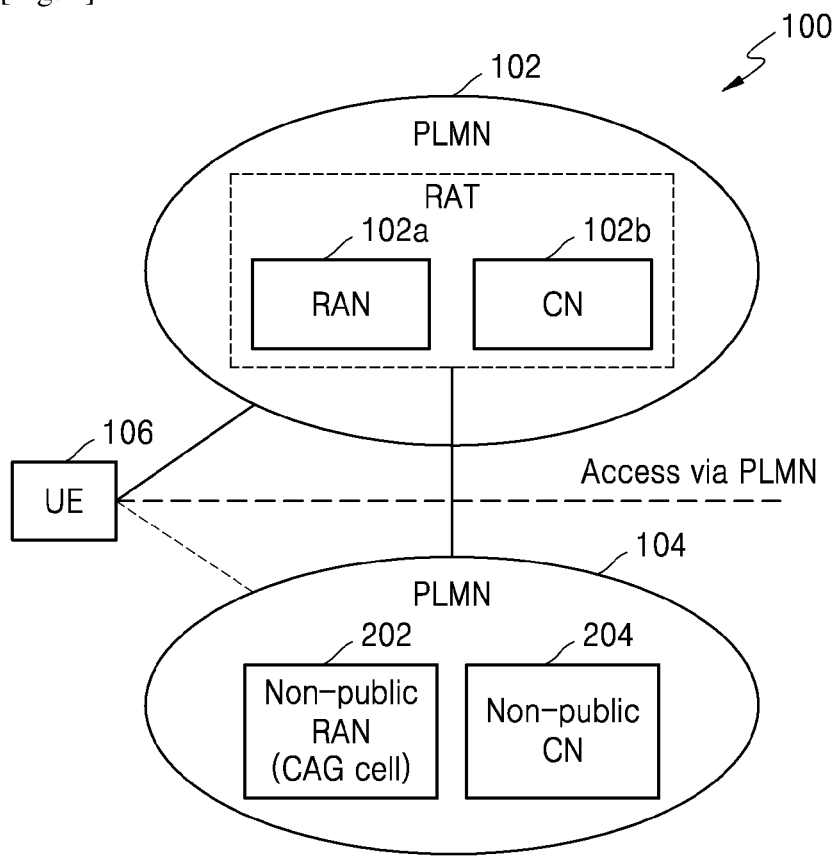

[Fig. 3]
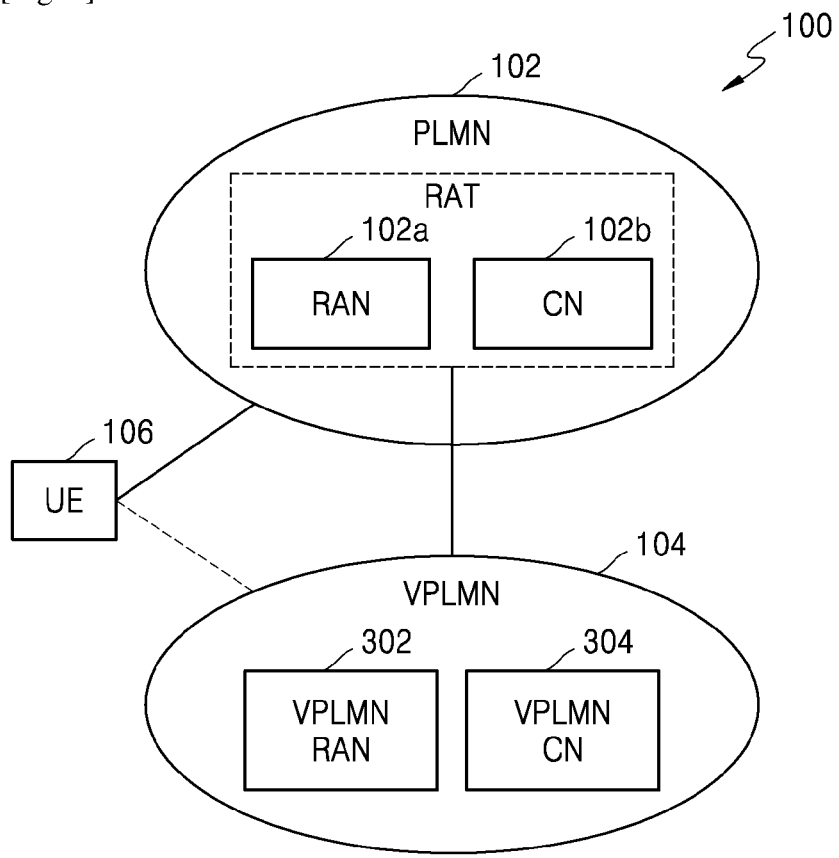
[Fig. 4]
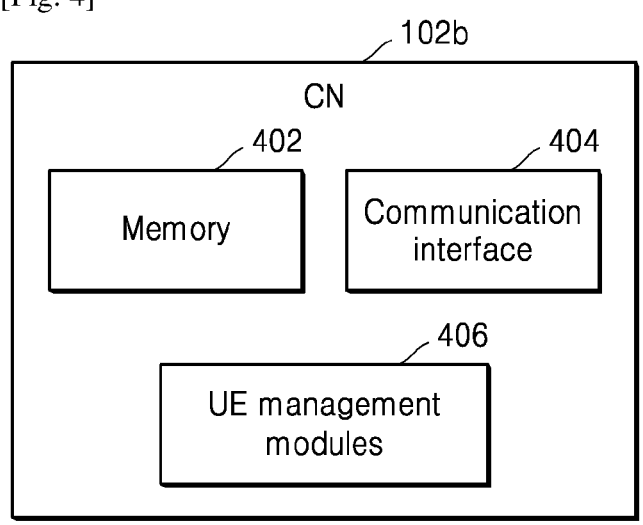

[Fig. 5A]
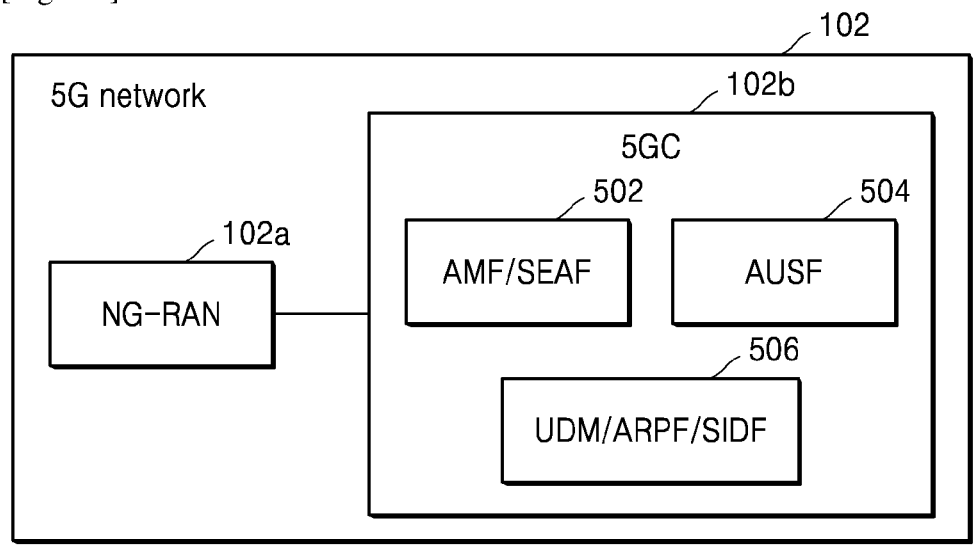
[Fig. 5B]
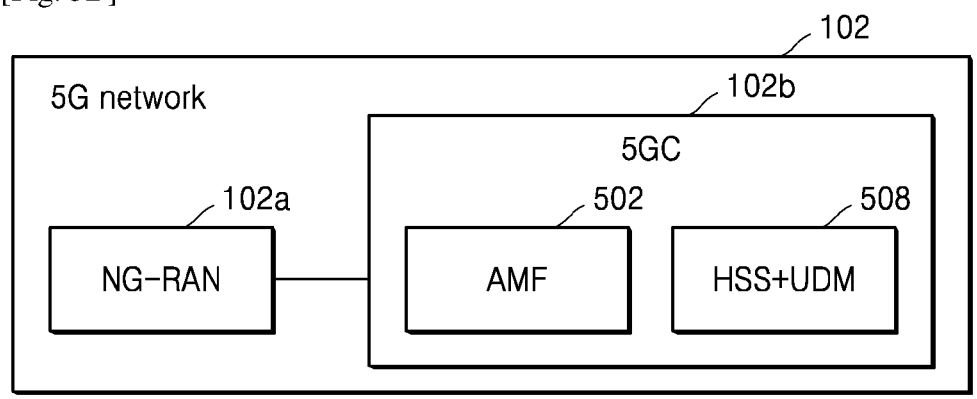

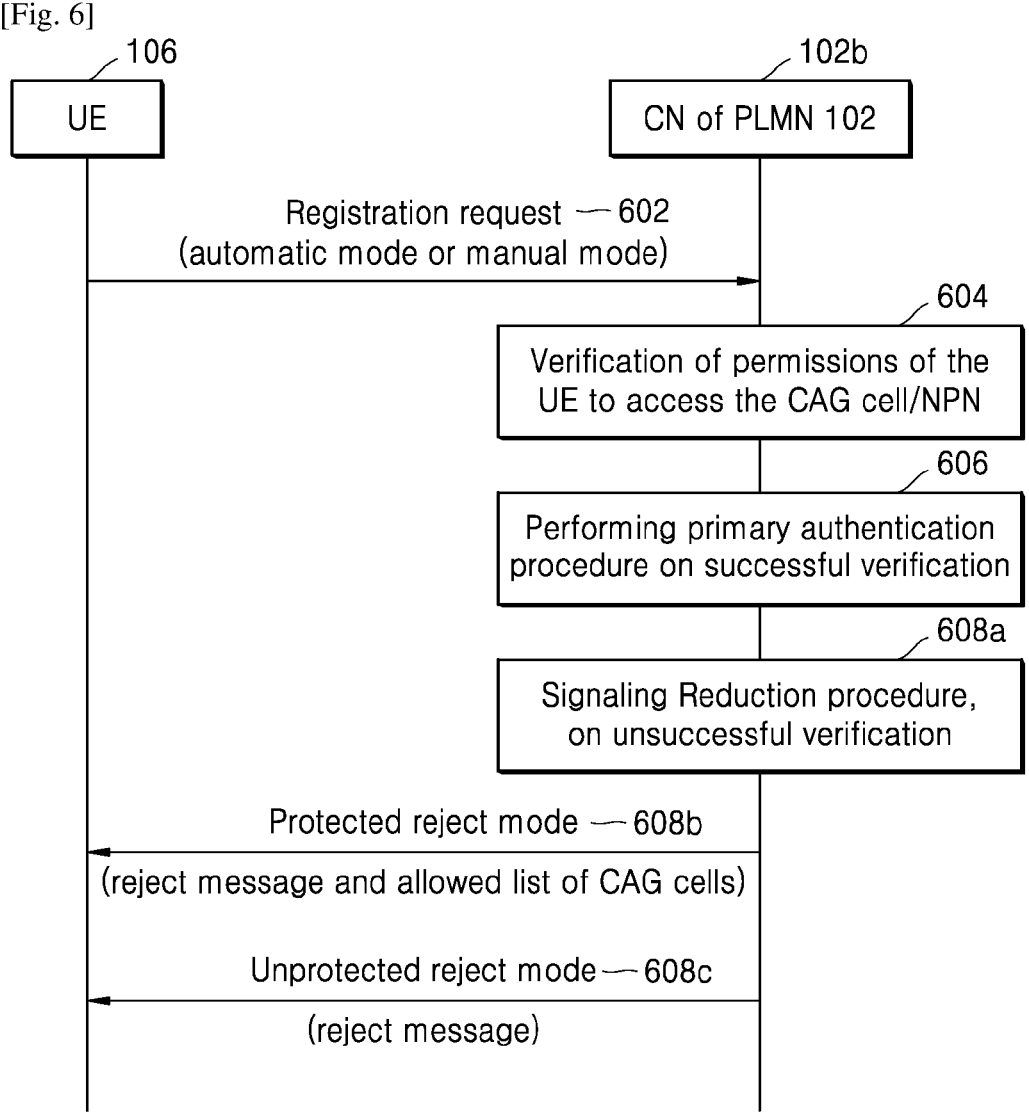

[Fig. 7]
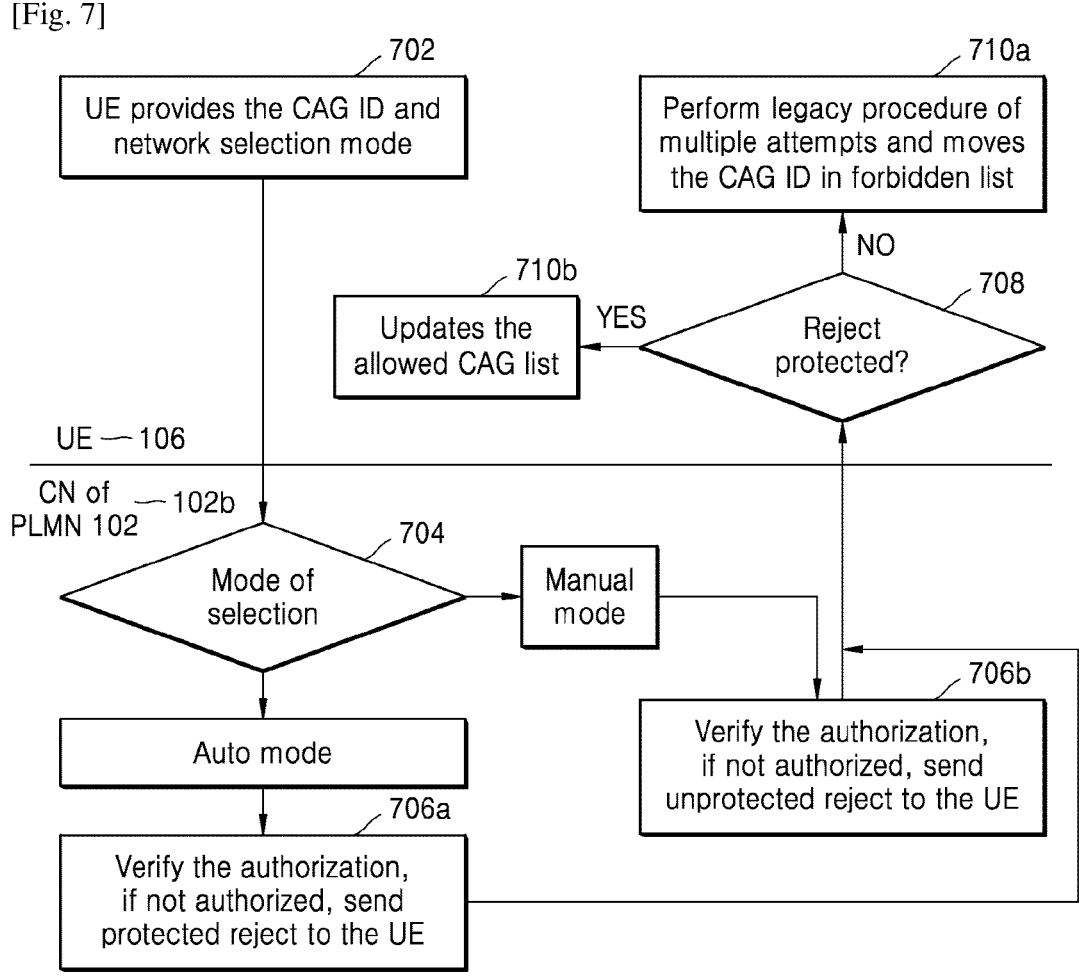

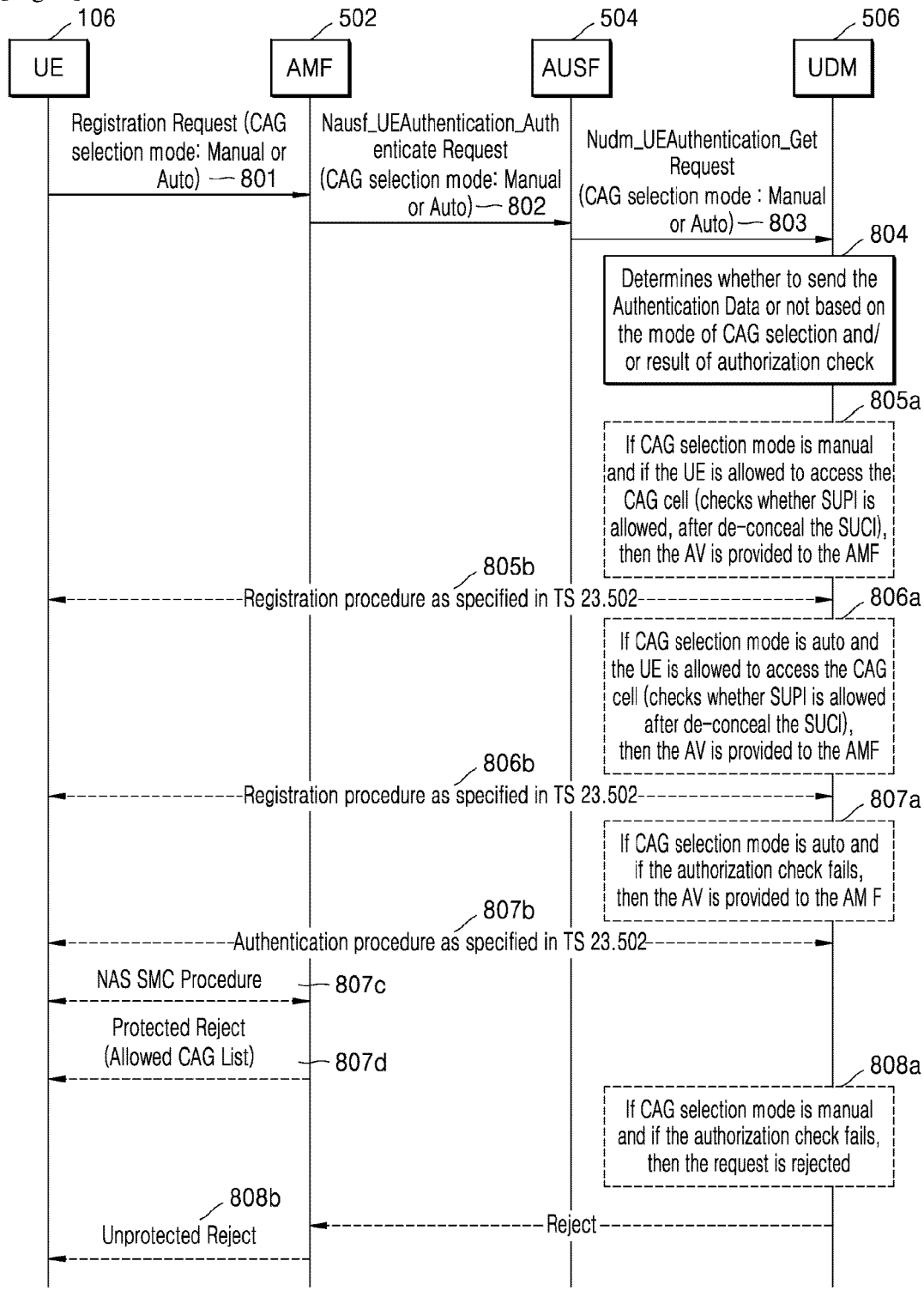

[Fig. 9]
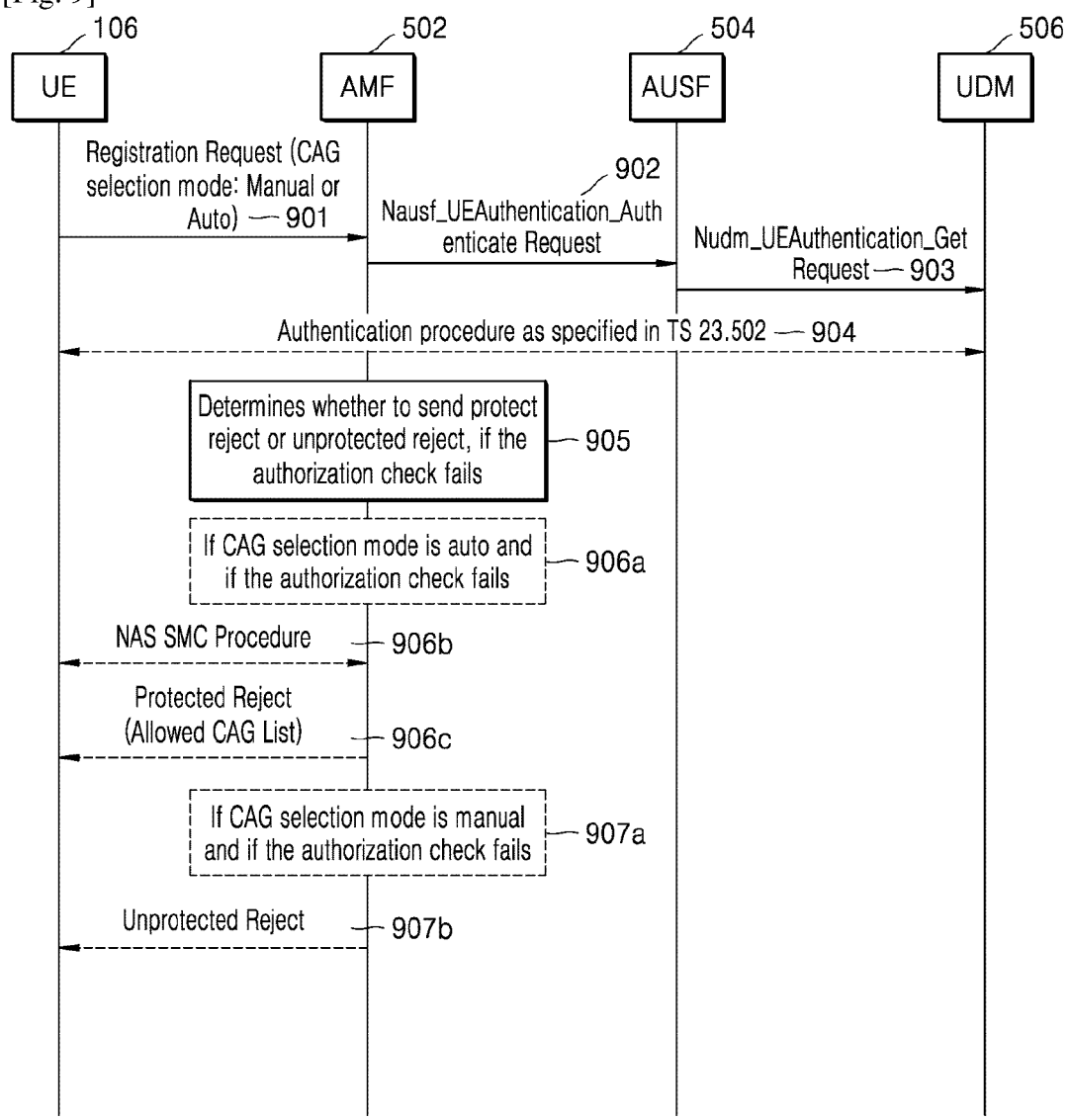

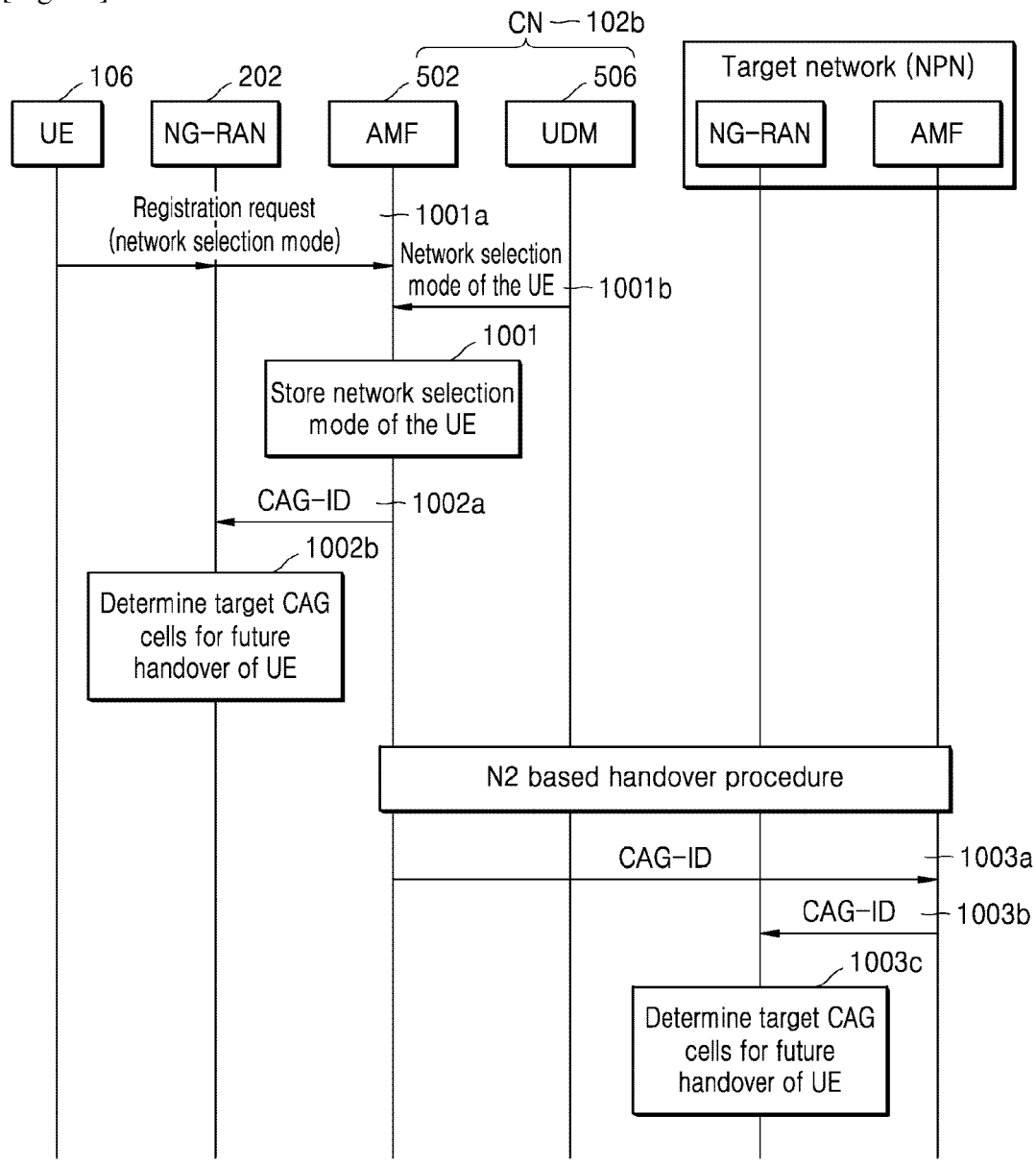
[Fig. 10]

[Fig. 11]
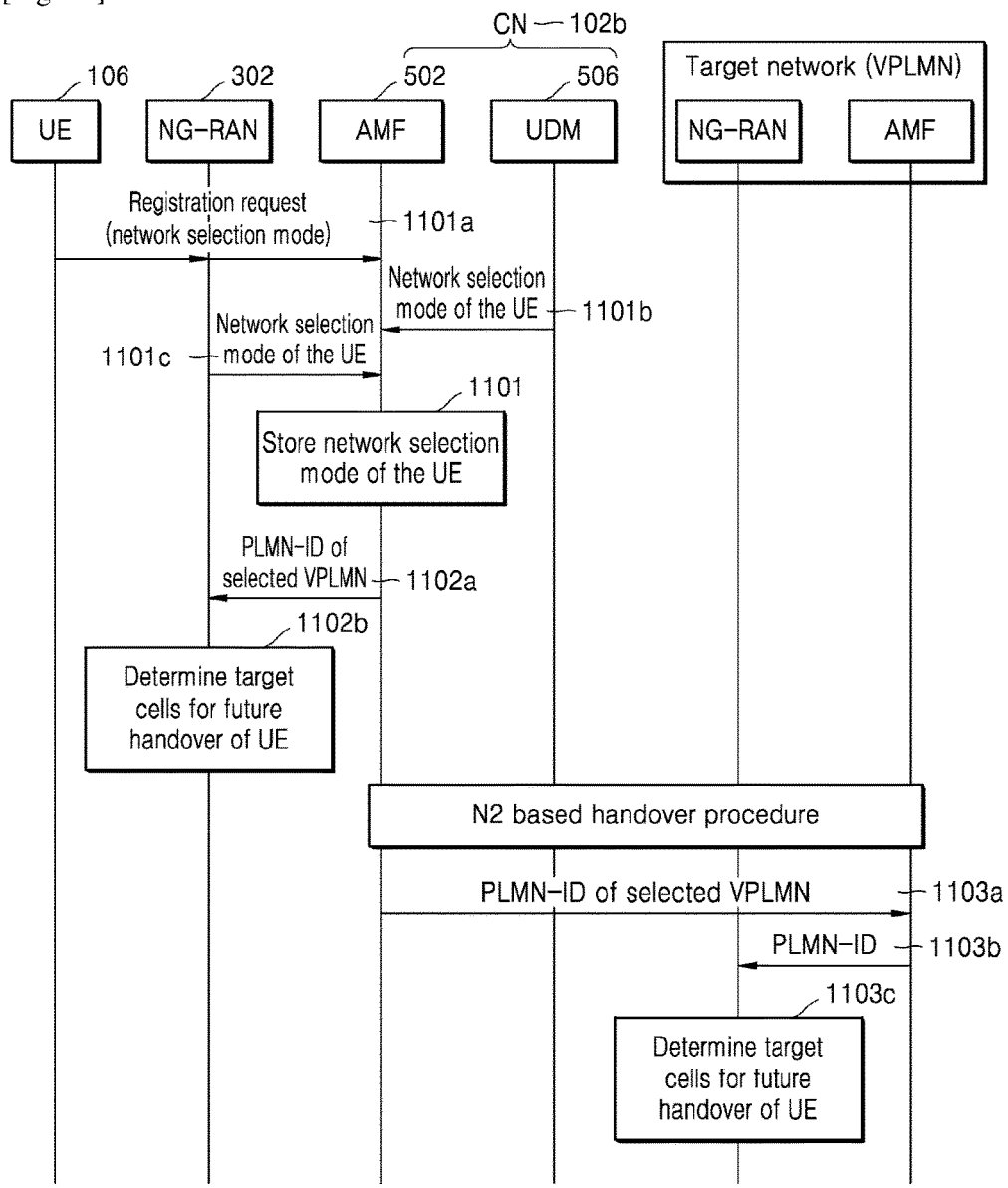
[Fig. 12]
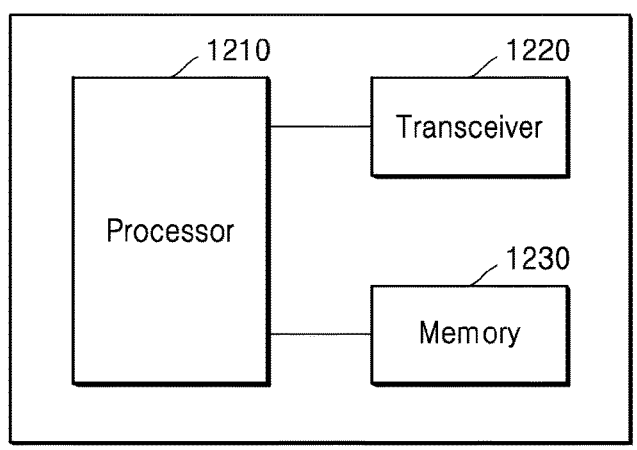

[Fig. 13]
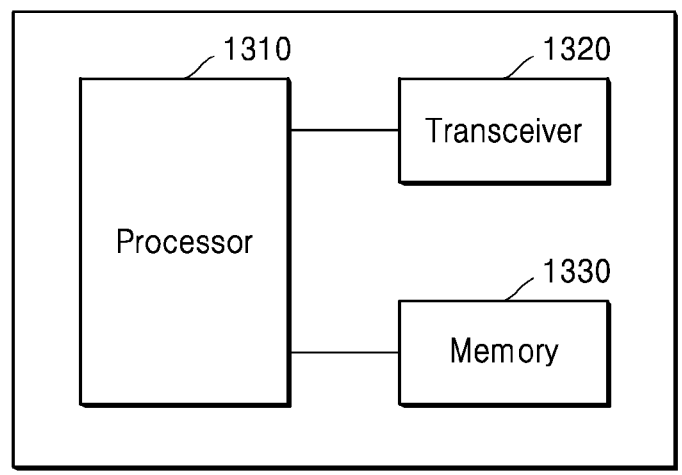
[Fig. 14]
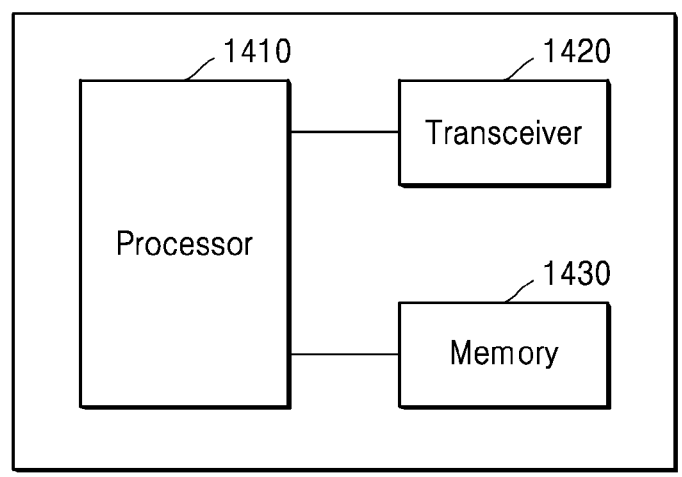

METHODS AND APPARATUS FOR CONTROLLING PERMISSIONS OF A UE FOR ACCESSING A NETWORK

TECHNICAL FIELD

The present disclosure relates to the field of wireless networks and more particularly to controlling permissions of a User Equipment (UE) for accessing a network as a part of an initial access procedure and a handover procedure, wherein the network includes one of a Non-Public Network (NPN) and a Public Land Mobile Network (PLMN).

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

A method for controlling permissions of a User Equipment (UE) to access at least one network is provided. The method comprises receiving, by a first network, a registration request from the UE for access to a second network and verifying, by the first network, permissions of the UE to access the requested second network. The method further comprises determining, by the first network, at least one reject mode based on a network selection mode of the UE for rejecting the registration request of the UE, if the permissions of the UE to access the second network are not verified.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 depicts a wireless communication system, according to embodiments as disclosed herein;

FIG. 2 depicts the wireless communication system including a Public Land Mobile Network (PLMN) and a Closed Access group (CAG) cell/Non-Public Network (NPN), according to embodiments as disclosed herein;

FIG. 3 depicts the wireless communication system including the PLMN and a Visited PLMN (VPLMN), according to embodiments as disclosed herein;

FIG. 4 is an example block diagram depicting various components of a Core Network (CN) of a PLMN for access control of a User Equipment (UE), according to embodiments as disclosed herein;

FIG. 5A is an example block diagram of the PLMN configured for access control of the UE, when the UE wants to access the network, wherein the CN of the PLMN is a 5GC network and the network is the CAG cell/NPN, according to embodiments as disclosed herein;

FIG. 5B is an example block diagram of the PLMN configured for access control of the UE, when the UE wants to access the network, wherein the CN of the PLMN is a 5GC network and the network is the VPLMN, according to embodiments as disclosed herein;

FIG. 6 is a sequence diagram depicting verification of the permissions of the UE to access the CAG cell/NPN using the signaling reduction procedure, according to embodiments as disclosed herein;

FIG. 7 is an example flow diagram depicting a method for verifying the permissions of the UE to access the CAG cell/NPN and performing the signaling reduction procedure based on the network selection mode of the UE, according to embodiments as disclosed herein;

FIG. 8 is a sequence diagram depicting the signaling reduction procedure performed at a unified data management (UDM) of the CN, according to embodiments as disclosed herein;

FIG. 9 is a sequence diagram depicting the signaling reduction procedure performed at an access and mobility management function (AMF) of the CN, according to embodiments as disclosed herein;

FIG. 10 is a sequence diagram depicting selection of target CAG cells based on the network selection mode for a handover of the UE, according to embodiments as disclosed herein;

FIG. 11 is a sequence diagram depicting selection of target cells of the VPLMN based on the network selection mode for the handover of the UE, according to embodiments as disclosed herein;

FIG. 12 schematically illustrates the base station according to embodiments of the present disclosure;

FIG. 13 illustrates a user equipment (UE) according to embodiments of the present disclosure; and FIG. 14 illustrates a network function (NF) according to embodiments of the present disclosure.

BEST MODE FOR CARRYING OUT THE INVENTION

Accordingly, the embodiments herein provide methods and systems for controlling permissions of a User Equipment (UE) for accessing a network. A method disclosed herein includes receiving, by a first network, a registration request from the UE for access to a second network. The method further includes verifying, by the first network, permissions of the UE to access the requested second network. The method further includes determining, by the first network, at least one reject mode based on a network selection mode of the UE for rejecting the registration request of the UE, if the permissions of the UE to access the second network are not verified.

Accordingly, the embodiments herein provide a wireless communication system comprising: a plurality of User Equipments (UEs), a second network and a first network. The first network is configured to receive a registration request from a UE of the plurality of UEs for access to a second network. The first network is further configured to verify permissions of the UE to access the requested second network. The first network is further configured to determine at least one reject mode based on a network selection mode of the UE for rejecting the registration request of the UE, if the permissions of the UE to access the second network are not verified.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

MODE FOR THE INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for controlling permissions of a User Equipment (UE) for accessing a network based on a network selection mode of the UE, wherein the network includes one of a Non-Public Network (NPN) and a Visited Public Land Mobile Network (VPLMN).

Embodiments herein disclose methods and systems for selecting a target network for the UE based on the network selection mode of the UE and initiating a handover of the UE from a serving network to the selected target network, wherein the selected network includes one of the NPN and the VPLMN.

In general, a User Equipment (UE) selects a network for accessing communication services using network selection modes such as, an automatic mode and a manual mode. The network may include one of a Non-Public Network (NPN) and a Public Land Mobile Network (VPLMN). In the automatic mode, a Public Land Mobile Network (PLMN)/serving network of the UE decides the network to be selected by the UE based on signal strength of the available networks. In the manual mode, the UE provides an available serving network list to a user of the UE and enables the user to select the network from the provided list of available networks.

In conventional approaches, the UE initiates a registration request with the serving network/VPLMN for accessing the selected network. However, the UE does not indicate the serving network about the network selection mode using which the UE has selected the network. As the UE does not indicate the network selection mode, the serving network has to authenticate the UE and verify/authorize the permissions of the UE to access the selected network using pre-configured agreements (that include one of, roaming agreements, allowed NPN for the UE, or the like), even though the serving network is overloaded. Further, the serving network may not be able to determine behavior of the UE and provide specific services to the UE, as the UE does not indicate the network selection mode in the registration request (for example, selection of the user preferred PLMN and/or Closed Access Group ID (CAG ID)/NPN during a handover).

Consider an example scenario, wherein the UE manually selects a VPLMN while roaming. In such a scenario, the UE sends a registration request to the serving network for accessing the communication services. However, the registration request does not indicate the serving network that the UE has selected the PLMN using the manual mode. Thus, the serving network may not be able to determine, if the UE has selected the network based on the automatic mode or the manual mode. Due to which, the AMF may not handle the mobility restrictions correctly/efficiently. For example, the serving network may handover the UE to another PLMN, which is not of interest to the user, as the UE does not indicate the network selection mode as manual mode to the network.

Consider another example scenario, wherein the UE selects a Closed Access Group (CAG) cell of an NPN for accessing the communication services using the manual mode. In such a scenario, the UE sends a registration request to the PLMN/serving network for connecting with the selected CAG cell to access the communication provided by the corresponding NPN. The registration request may include a subscription concealed identifier (SUCI). However, the registration request does not indicate the serving network that that the UE has selected the cell using the manual mode. Thus, the serving network has to perform a primary authentication procedure to authenticate the UE based on the received SUCI of the UE. On the successful authentication procedure, the serving network has to verify, if the UE has permissions or if the UE is authorized to access the CAG cells/NPN. However, the serving network has to wait until completion of the successful primary authentication procedure to verify if the UE has the permissions to access the CAG cells/NPN cells, which may result in an overhead on the serving network.

Further, if a large number of UEs with or without valid permissions to access the CAG cells may send the registration request to the serving network. Such a scenario may result in an overhead on the network, as the network has to perform the primary authentication procedure to authenticate the UEs, even though the CAG ID is selected manually by the UEs and the UEs are not allowed to access the CAG cells.

Further, if there is de-sync in an allowed list of CAG cells in the UE and the serving network, then the UE makes repeated attempts to access the CAG cell, whereas the serving network may reject the request and at the same time, the serving network has to determine whether to update the allowed list of CAG cells for the UE.

The principal object of the embodiments herein is to disclose methods and systems for controlling permissions of a User Equipment (UE) to select a network, wherein the network includes one of a Non-Public network (NPN) and a Visited Public Land Mobile Network (PLMN).

Another object of the embodiments herein is to disclose methods and systems for enabling the UE to send a registration request to a serving network for an access to the selected network, wherein the registration request indicates a network selection mode using which the UE has selected the network, wherein the network selection mode includes one of an automatic mode and a manual mode.

Another object of the embodiments herein is to disclose methods and systems for enabling the serving network to determine a reject mode for rejecting the registration request of the UE based on the network selection mode indicated in the registration request, when the permissions of the UE to access the selected network have not been verified, wherein the reject mode includes a protected reject mode and an unprotected reject mode.

Another object of the embodiments herein is to disclose methods and systems for enabling the serving network to send a reject message indicating the rejection of the registration request to the UE after establishing a Non-Access Stratum (NAS) security context with the UE, in the protected reject mode.

Another object of the embodiments herein is to disclose methods and systems for enabling the serving network to send the reject message indicating the rejection of the registration request to the UE before establishing the NAS security context with the UE, in the unprotected reject mode.

Another object of the embodiments herein is to disclose methods and systems for enabling the serving network to initiate a handover of the UE by selecting a target network (the NPN or the VPLMN) for the UE, wherein the target network is selected based on the network selection mode of the UE.

Referring now to the drawings, and more particularly to FIGS. 1 through 14, where similar reference characters denote corresponding features consistently throughout the figures, there are shown example embodiments.

FIG. 1 depicts a wireless communication system 100, according to embodiments as disclosed herein. The wireless communication system/network 100 referred herein can be configured to control permissions of at least one User Equipment (UE) for accessing a network and determine a target network for the at least one UE for a handover, by reducing an exchange of signalling between the at least one UE and a serving network. In an embodiment, the network may include one of, but is not limited to, a Non-Public Network (NPN), a Visited Public Land Mobile Network (VPLMN), or the like.

The wireless communication system 100 includes a Public Land Mobile Network (PLMN) 102, one or more networks 104, and one or more User Equipments (UEs) 106.

The PLMN 102 referred herein may include one or more different Radio Access Technologies (RATs)/cellular networks such, as, but is not limited to, a 3rd Generation Partnership Project (3GPP) 3rd Generation (3G), an Long Term Evolution (LTE/4G), an LTE-Advanced (LTE-A), a Fifth Generation (5G) New Radio (NR), a Universal Mobile Telecommunications Service (UMTS), a Global System for Mobile Communications (GSM) Enhanced Data rates for GSM Evolution (EDGE) Radio Access Network (GERAN) system Wireless Local Area Network (WLAN), Worldwide Interoperability for Microwave Access (WiMAX/IEEE 802.16), Wi-Fi (IEEE 802.11), Evolved-UTRA (E-UTRA), a Narrowband Internet of Things (NB-IoT), or any other next generation networks.

The PLMN 102 may be configured to provide communication services to the UEs 106 in a specific region. Examples of the communication services may be, but is not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3GPP service (for example: firewalling or the like), and so on.

In an example, the PLMN 102 may be a home PLMN (HPLMN) or serving network for the UE 106. The HPLMN 102 may be a PLMN to which the UE 106 is subscribed. The HPLMN 102 may manage a profile of the UE 106 (referred hereinafter as UE profile) to provide communication services to the UE 106. The UE profile may include UE state information (for example: an Radio Resource Control (RRC) connection state, an RRC inactive state, or the like), security information, UE capability information, subscription of the UE for the communication services, identities of the UE-associated logical S1 connection, and so on. In an embodiment, the PLMN 102 may be a serving VPLMN. The VPLMN may be a PLMN of an area to which the UE 106 roams and moves. Embodiments herein use the terms such as, "PLMN", "cellular network", "public network", "3GPP access network", "RAT", "home network", "home PLMN", "source PLMN", "first network", "serving network", "source VPLMN", "source network", "serving VPLMN" and so on, interchangeably to refer to the network 102 that provides the communication services to public use in a given region.

The one or more networks 104 referred herein may be one or more networks, which of interest to the UE 106/a user of the UE 106. In an example, the UE 106 may select the one or more networks 104 for accessing the communication services as a part of an initial access procedure. In another example, the UE 106 may select the one or more networks 104 for initiating a handover from the PLMN 102 to the one or more networks 104 for accessing the communication services, when the UE 106 roams.

In an embodiment, the one or more networks 104 referred herein may be NPNs/private networks 104. The NPN(s) 104 may be configured to provide coverage and communication services to the UEs 106 present within a location/premises such as, but is not limited to, an organization, an enterprise, a factory, a campus, a room, a floor, and so on. The communication services provided by the NPN 104 may be private communication services that have been defined by the premises. Examples of the private communication services may be, but is not limited to, a streaming service (streaming of multimedia data such as audio, video, text and so on), a file download service, and so on. The NPN 104 may be deployed as a non-standalone NPN. The non-standalone NPN 104 may be deployed in conjunction with the PLMN 102. The NPN 104 may be deployed in conjunction with the PLMN 102 using a network slicing and/or a Closed Access Group (CAG) (as specified in 3GPP TS 23.501). The CAG is used to apply an access control, to prevent the UE(s) 106 from trying to access the NPN 104 in areas which the UE 106 has not been allowed to use the network slice allocated for the NPN 104. The CAG is used for the NPN 104 (the non-standalone network/the public network integrated NPN) to prevent the UE(s) 106, which have not been allowed to access the NPN via the associated CAG cell(s), from automatically selecting and accessing the associated CAG cell(s). The CAG cell may be identified by a CAG Identifier (CAG ID) which is unique within the scope of a PLMN ID. The CAG cell broadcasts one or multiple CAG Identifiers (CAG IDs) per PLMN and a CAG cell may in addition broadcasts a human-readable network name per CAG Identifier. The network slicing provides dedicated data networks (DNNs), or one or more network slice instances that may make the NPN 104 available to the UEs 106 via the PLMN 102. The NPN 104 may serve one or more CAG cells. The NPN/CAG cell 104 may broadcast the CAG identifier (CAG ID) to the UEs 106 within the defined location/premises, so that the UE 106 may identify the CAG cell. Alternatively, the NPN 104 may be a standalone NPN. The stand-alone NPN 104 may be deployed without requiring the support of the PLMNs. The stand-alone NPN 104 may use the CAG and/or a non-public network identifier to identify a group of subscribers/UEs, who are permitted to access the one or more CAG cells/NPN. Embodiments herein use the terms such as "NPN", "private network", "public network integrated NPN", "non-3GPP access network", "non-standalone NPN", "CAG cells", and so on, interchangeably to refer to a network configured to provide the coverage and private services to the UEs 106 present within the defined location/premises.

In an embodiment, the one or more networks 104 referred herein may be one or more VPLMNs 104. The VPLMN 104 may be a PLMN of an area to which UE 106 roams and moves. For example, consider that the UE 106 subscribes to the PLMN 102 located in an area 1, therefore the PLMN 102 located in the area 1 acts as the HPLMN 102 for the UE 106. The HPLMN 102 manages the UE profile and provides the communication services to the UE 106, when the UE 106 is located in the area 1. When the UE 106 roams to an area 2, the HPLMN 102 may no longer provide the communication services to the UE 106. Therefore, the PLMNs/networks 104 present in the area 2 may act as the VPLMNs 104 for the UE 106. The UE 106 may select one of the VPLMNs 104 for accessing the communication services in the area 2.

Embodiments herein use the terms such as "target network", "NPN", "CAG cell of the NPN", "target CAG cell", "target VPLMN", "second network", and so on, interchangeably to refer to the network 104 through the document.

The UE(s) 106 referred herein can be a user device that is capable of supporting the PLMN 102 and the one or more networks 104. Examples of the UE 106 may be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a Universal Serial Bus (USB) dongle, a sensor, a robot, an auto-guided vehicle, or any other that supports the PLMN 102 and the one or more networks 104 (the NPN or the VPLMN 104). The UE 106 may include one or more processors/Central Processing Units (CPUs), a memory, a transceiver, and so on, for performing at least one intended function/operation.

The UE 106 may be configured to access the PLMN 102 for the communication services, on registering with the PLMN 102. The PLMN 102 may be the serving network/home PLMN or the serving VPLMN for the UE 106. The UE 106 may also be configured to select the one or more networks 104 and access the selected network 104 for the communication services. In an example, the UE 106 may select the network 104 for accessing the specific communication services provided by the one or more networks 104 as part of the initial access procedure. In another example, the UE 106 may select the one or more networks 104 for performing a handover from the PLMN 102 to the selected network 104, when the PLMN 102 is no longer available to serve the UE 106 (i.e., when the UE 106 roams).

The UE 106 may access the selected network 104 for the communication services by having subscriptions/permissions with the PLMN 102. The PLMN 102 may store, update, and modify/revise the permissions of the UE 106. In an example, if the network(s) 104 is the NPN 104, the subscriptions/permissions may include at least one of NPN permissions/subscriptions and permissions/subscriptions to access the CAG cell(s)/NPN(s) 104. The NPN permissions may indicate that the UE 106 is authorized to access the NPN/the services provided by the NPN 104 via the PLMN 102. The permissions to access the CAG cell/NPN 104 may indicate an allowed list of CAG cells/CAG IDs for the UE 106. The permissions to access the CAG cells may be configured for the UE 106 based on its NPN permissions. The permissions to access the CAG cells/allowed CAG list is configured for the UE 106 using existing 3GPP procedures (for example: over the air mechanism, UE configuration update procedure, or the like). Embodiments herein use the terms such as "permissions to access the CAG cell", "CAG cell permissions", "allowed list of CAG cells/CAG IDs", "allowed CAG cell permissions" "subscriptions", and so on interchangeably to refer to allowed CAG cells/NPN 104 for the UE 106. In another example, if the network(s) 104 is the VPLMN 104, the subscriptions/permissions may be roaming agreements configured by the PLMN 102 for the UE 106.

The UE 106 may select the network(s) 104 using one of network selection modes. The network selection modes may be, but is not limited to, an automatic mode, a manual/user selection mode, or the like. In the automatic mode, the PLMN 102 checks the available one or more networks 104 for the UE 106 based on factors associated with the one or more networks 104 and selects one of the network 104 for the UE 106. Examples of the factors may be, but is not limited to, signal strength, listing associated with the selected network, or the like. In an example, the listing associated with the selected network 104 may indicate that the selected network is one of the preferred PLMN, the HPLMN, an Equivalent PLMN (EPLMN), or the like. In an example, the PLMN 102 selects one of the network 104 for the UE 106 based on the permissions (i.e., the permissions to access the CAG cells/NPN 104 or the roaming agreements) configured for the UE 106. In the manual mode, the UE scans for the one or more available networks 104 in its vicinity. The UE 106 displays the one or more available networks 104 to the user and allows the user to select the network from the displayed one or more available networks 104.

Embodiments herein control permissions of the UE 106 to access the selected network 104 based on the network selection mode of the UE 106, when the UE 106 wants to access the selected network 104 as a part of the initial access procedure.

On selecting the network 104, the UE 106 initiates a registration procedure with the PLMN 102 for accessing the communication services from the selected network 104. The UE 106 initiates the registration procedure by sending a registration request to the PLMN 102 after establishing an RRC connection with the PLMN 102. In an example, if the selected network 104 is the CAG cell/NPN 104, the UE 106 sends the registration request directly to the PLMN 102. In another example, if the selected network 104 is the VPLMN 104, the UE 106 sends the registration request to the selected VPLMN 104, which in turns forwards the registration request to the PLMN 102. In an embodiment, the registration request includes information/identifier of the selected network 104 and the network selection mode using which the UE 106 has selected the network 104.

On receiving the registration request from the UE 106, the PLMN 102 verifies if the UE 106 has the permissions to access the selected network 104 using the stored permissions of the UE 106. If the UE 106 has the permissions to access the selected network 104, the PLMN 102 may perform a primary authentication procedure of the UE 106 and allow the UE 106 to access the selected network 104 for the communication services, if the primary authentication procedure of the UE 106 is successful. In an example, if the selected network is the CAG cell/NPN 104 and the UE 106 has the permissions to access the selected CAG cell, the PLMN 102 allows the UE 106 to access the selected CAG cell by authenticating the UE 106. The PLMN 102 may authenticate the UE 106 based on the NPN permissions of the UE 106. In another example, if the selected network is the VPLMN 104, the PLMN 102 allows the UE 106 to access the VPLMN 104 by initiating the handover of the UE 106 from the PLMN 102 to the selected VPLMN 104. Thus, the UE 106 may connect to the VPLMN 104 of its interest.

If the UE 106 does not have the permissions to access the requested selected network 104, the PLMN 102 determines a reject mode that may be used to reject the registration request of the UE 106. Rejecting the registration request of the UE 106 by determining the reject mode may reduce a signalling flow between the UE 106 and the PLMN 102. In an embodiment herein, determining the reject mode for rejecting the registration request may be referred as a signalling reduction procedure throughout the document.

The reject mode can be at least one of a protected reject mode, and an unprotected reject mode.

In an embodiment, the PLMN 102 determines the reject mode based on the network selection mode using which the UE 106 has selected the network 104. For determining the reject mode, the PLMN 102 identifies the network selection mode indicated in the received registration request. On identifying the network selection mode, the PLMN 102 checks criteria for determining the reject mode. The PLMN 102 checks the criteria for determining the reject mode using stored information such as, but not limited to, the permissions of the UE 106, previous reception of the registration requests of the UE 106, and so on. The criteria may include one or more parameters related to the permissions of the UE 106, the registration requests of the UE 106, and so on. In an example herein, if the network selection mode is the manual mode, the PLMN 102 checks the criteria such as, but not limited to, a frequency of the registration requests received from the UE 106, time of last successful authentication of the UE 106, and so on. In another example herein, if the network selection mode is the automatic mode, the PLMN 102 checks the criteria such as, but not limited to, if the permissions of the UE 106 to access the selected network 104 have been updated/modified/revised, time of last successful authentication of the UE 106, updated/provisioned/modified/revised time of the permissions of the UE 106, and so on. The PLMN 102 determines the reject mode for rejecting the registration request of the UE 106, based on the determined network selection mode and the criteria that have been checked for the corresponding network selection mode.

In an example herein, the PLMN 102 determines the protected reject mode for rejecting the registration request of the UE 106, on determining that the network selection mode is the automatic mode and checking the criteria corresponding to the automatic mode. In an example herein, the PLMN 102 determines the unprotected reject mode for rejecting the registration request of the UE 106, on determining that the network selection mode is the manual mode and checking the criteria corresponding to the manual mode.

In the protected reject mode, the PLMN 102 establishes a Non Stratum Access (NAS) security context with the UE 106, and sends a reject message to the UE 106. The reject message indicates that the UE 106 does not have the permissions to access the selected network 104. The reject message sent in the protected reject mode may also include the allowed list of networks 104 for the UE 106. Embodiments herein use the terms such as "protected reject mode", "post-authorization", "deferred authorization", "later stage rejection", and so on, interchangeably to refer to a mode of rejecting the registration request by establishing the NAS security context with the UE 106.

In the unprotected reject mode, the PLMN 102 sends the reject message to the UE 106 without establishing the NAS security context with the UE 106. Embodiments herein use the terms such as "unprotected reject mode", "immediate authorization", "early stage rejection", and so on, interchangeably to refer to a mode of rejecting the registration request without establishing the NAS security context with the UE 106.

Embodiments herein also manage a handover of the UE 106 by selecting the target cells for the UE 106 based on the network selection mode of the UE 106. The selected target cells may include one of the CAG cell of the NPN 104 and cells of the VPLMN 104.

The PLMN 102 (the home PLMN or the VPLMN) may store the network selection mode of the UE 106 that has been received from the UE 106, as a part of the registration request. Alternatively, the PLMN 102 may receive the network selection mode from the UE 106 separately over at least one of a NAS message, an Access Stratum (AS) message, or the like. The PLMN 102 may store the network selection mode of the UE 106 for handling future handovers of the UE 106.

In an embodiment, during a handover procedure of the UE 106, the PLMN 102 selects the target cell for the UE 106 based on the stored network selection mode of the UE 106 and the identifier of the network 104 selected by the UE 106 (which has been received as the part of the registration request) using the stored network selection mode. The PLMN 102 enables the handover of the UE 106 to the selected target cell. The selected target cell may include one of the cells being served by the network 104 that has been selected by the UE 106 or the network that is different from the selected network 104. In an example herein, the selected target cell includes one of the CAG cell of the NPN and the cell of the VPLMN.

Consider an example herein, wherein the UE 106 initially has the permission to access the PLMN 102. The UE 106 may move/roam to another area, wherein the PLMN 102 may no longer serve the UE 106. In such a scenario, the UE 106 may select the network 104 based on one the automatic mode or the manual selection mode. The UE 106 may send the network selection mode and the network identifier of the selected network 104 to the PLMN 102 in the registration request. If the UE 106 has selected the network 104 using the manual mode, the PLMN 102 selects the network 104 that has been selected by the UE 106 or the cells being served by the network 104 for the UE 106 for the handover. If the UE 106 has selected the network 104 using the automatic mode, the PLMN 102 selects the network or the cells being served by the network for the UE 106 for the handover, based on the signal strength of the networks available for the UE 106 for the handover. The networks may include of the NPN and the VPLMN.

In an embodiment, during a N2 based handover procedure of the UE 106, the PLMN 102 selects the target network 104 for the UE 106 (according to 3GPP specification TS 23 502) and forwards the stored network selection mode of the UE 106 and the identifier of the selected network 104 using the stored network selection mode to the selected target network 104. The target network may be a user preferred network, which has been selected by the PLMN 102 to handover the UE 106. The PLMN 102 selects the target network for the UE 106 based on the network selection mode of the UE 106. In an example, the target network may be the network 104 selected by the UE 106, if the network selection mode is the manual mode. In another example, the target network may be the network having the highest signal strength compared to other networks available for the handover of the UE 106, if the network selection mode is the automatic mode. The target network 104 may select target cell(s) based on the network selection mode of the UE 106 and the identifier of the selected network 104 and enables the UE 106 to handover to the selected target cell(s). The target cell may include one of the CAG cell and the cell of the VPLMN.

Consider an example scenario, wherein the UE 106 selects the NPN/VPLMN 104 using the manual mode. In such a scenario, the UE 106 sends the registration request including the network selection mode and the identifier of the selected CAG cell (CAG ID)/VPLMN 104 to the PLMN 102 for the access to the selected NPN/VPLMN 104. The PLMN 102 stores the received manual selection mode of the UE 106 for handling the future handovers of the UE 106. During the future handover procedure, the PLMN 102 may select the cells for the UE 206 for the handover based on the identifier of the selected CAG cell/VPLMN 104 and/or based on the stored network selection mode for the UE 106 (manual selection mode). Thus, the selected network 104 (CAG cell/VPLMN 104) by the UE 106 in the manual mode may be honored and the PLMN 102 may stick to the selected network.

In an embodiment according to the present disclosure, a method for controlling permissions of a User Equipment (UE) 106 to access at least one network is provided. The method comprising: receiving, by a first network 102, a registration request from the UE 106 for access to a second network 104; verifying, by the first network 102, permissions of the UE 106 to access the requested second network 104; and determining, by the first network 102, at least one reject mode based on a network selection mode of the UE 106 for rejecting the registration request of the UE 106, if the permissions of the UE 106 to access the second network 104 are not verified.

In an embodiment, wherein the first network 102 includes a Public Land Mobile Network (PLMN), and wherein the PLMN is at least one of a home PLMN (HPLMN) or a serving Visited PLMN (VPLMN).

In an embodiment, wherein the second network 104 includes one of, at least one Closed Access Group (CAG) cell of a Non-Public Network (NPN), a serving network of the PLMN or a VPLMN.

In an embodiment, wherein the registration request includes at least one of, the network selection mode of the UE 106, or an identifier indicating the second network 104.

In an embodiment, wherein:
the network selection mode is a mode using which the UE 106 has selected the second network 104 for accessing at least one communication service, wherein the network selection mode includes one of an automatic mode and a manual mode;
the identifier includes a CAG identifier (CAG ID) of the at least one CAG cell of the NPN, if the second network 104 includes the at least one CAG cell of the NPN; and
the identifier includes a PLMN identifier (PLMN-ID) indicating the VPLMN, if the second network 104 includes the VPLMN.

In an embodiment, wherein verifying, by the first network 102, the permissions of the UE 106 to access the second network 104, wherein the second network 104 includes the at least one CAG cell of the NPN, includes: receiving a subscription concealed identifier (SUCI) from the UE 106 in the registration request; revealing the received SUCI of the UE 106 to a subscription permanent identifier (SUPI); deriving an allowed list of CAG IDs for the UE 106 based on the SUPI; determining if the received CAG ID of the at least one CAG cell of the NPN in the registration request is present in the retrieved allowed list of CAG IDs; determining that the permissions of the UE 106 to access the at least one CAG cell of the NPN are verified, if the received CAG ID of the at least one CAG cell is present in the retrieved allowed list of CAG IDs; and determining that the permissions of the UE 106 to access the at least one CAG cell of the NPN are not verified, if the received CAG ID of the at least one CAG cell is not present in the retrieved allowed list of CAG IDs.

In an embodiment, wherein determining, by the first network, the at least one reject mode includes: determining the network selection mode of the UE 106 from the received registration request, if the permissions of the UE 106 to access the second network 104 are not verified; checking at least one criteria associated with the determined network selection mode of the UE 106; and determining the at least one reject mode based on the determined network selection mode and the checked at least one criteria for rejecting the registration request of the UE 106, wherein the at least one reject mode incudes one of, a protected reject mode and an unprotected reject mode.

In an embodiment, wherein:
the protected reject mode for rejecting the registration request of the UE 106 is determined, on determining that the network selection mode of the UE 106 is the automatic mode and checking the at least one criteria corresponding to the automatic mode, wherein the at least one criteria corresponding to the automatic mode includes at least one of, a check performed to determine if an allowed list of second networks 104 for the UE 106 is updated, and an updated time of last allowed list of second networks 104 for the UE 106; and
the unprotected reject mode for rejecting the registration request of the UE 106 is determined, on determining that the network selection of the UE 106 is the manual mode and checking the at least one criteria corresponding to the manual mode, wherein the at least one criteria corresponding to the manual mode includes one of, a frequency of reception of registration requests from the UE 106, and time of last successful authentication of the UE 106.

In an embodiment, wherein rejecting the registration request in the protected reject mode includes: performing a primary authentication procedure and establishing a Non-Stratum Access (NAS) security context with the UE 106; and sending a reject message and the allowed list of second networks 104 to the UE 106 over the established NAS security context with the UE 106.

In an embodiment, wherein rejecting the registration request in the unprotected reject mode includes sending the reject message to the UE 106, before establishing the NAS security context with the UE 106.

In an embodiment, the method further comprising one of:
performing the primary authentication of the UE 106, if the permissions of the UE 106 to access the second network 104 are verified; or
enabling the UE 106 to access the second network 104, based on the primary authentication of the UE 106.

In an embodiment, the method further comprising: managing, by the first network 102, a subsequent handover of the UE 106 by performing one of:
determining, by the first network 102, at least one target cell for the subsequent handover of the UE 106 based on the network selection mode of the UE 106; and/or
providing, by the first network 102, the identifier of the second network 104 to a third network based on the network selection mode of the UE 106, wherein the third network determines at least one target cell for the subsequent handover of the UE 106, based on the at least one of the selected identifier of the second network 104 and the selection mode of the UE 106, wherein the third network includes one of, the second network 104, and at least one network other than the second network 104.

In an embodiment according to the present disclosure, A wireless communication system 100 comprising: a plurality of User Equipments (UEs) 106; a second network 104; and a first network 102.

In an embodiment, wherein the first network 102 is configured to:
receive a registration request from a UE 106 of the plurality of UEs for access to a second network 104; verify permissions of the UE 106 to access the requested second network 104; and determine at least one reject mode based on a network selection mode of the UE 106 for rejecting the registration request of the UE 106, if the permissions of the UE 106 to access the second network 104 are not verified.

In an embodiment, wherein the first network 102 includes a Public Land Mobile Network (PLMN), wherein the PLMN is one of, a home PLMN (HPLMN) and/or a serving Visited PLMN (VPLMN).

In an embodiment, wherein the second network 104 includes one of, at least one Closed Access Group (CAG) cell of a Non-Public Network (NPN) and a VPLMN.

In an embodiment, wherein the registration request includes at least one of, the network selection mode of the UE 106, and an identifier indicating the second network 104.

In an embodiment, wherein:
the network selection mode is a mode using which the UE 106 has selected the second network 104 for accessing at least one communication service, wherein the network selection mode includes one of an automatic mode and a manual mode;
the identifier includes a CAG identifier (CAG ID) of the at least one CAG cell of the NPN, if the second network 104 includes the at least one CAG cell of the NPN; and
the identifier includes a PLMN identifier (PLMN ID) indicating the VPLMN, if the second network 104 includes the VPLMN.

In an embodiment, wherein the first network 102 is further configured to verify the permissions of the UE 106 to access the second network 104, wherein the second network 104 includes the at least one CAG cell of the NPN by:
receiving a subscription concealed identifier (SUCI) from the UE 106 in the registration request;
revealing the received SUCI of the UE 106 to a subscription permanent identifier (SUPI);
deriving an allowed list of CAG IDs for the UE 106 based on the SUPI;
determining if the received CAG ID of the at least one CAG cell of the NPN in the registration request is present in the retrieved allowed list of CAG IDs;
determining that the permissions of the UE 106 to access the at least one CAG cell of the NPN are verified, if the received CAG ID of the at least one CAG cell is present in the retrieved allowed list of CAG IDs; and
determining that the permissions of the UE 106 to access the at least one CAG cell of the NPN are not verified, if the received CAG ID of the at least one CAG cell is not present in the retrieved allowed list of CAG IDs.

In an embodiment, wherein the first network 102 is further configured to:
determine the network selection mode of the UE 106 from the received registration request, if the permissions of the UE 106 to access the second network 104 are not verified;
check at least one criteria associated with the determined network selection mode of the UE 106; and
determine the at least one reject mode based on the determined network selection mode and the checked at least one criteria for rejecting the registration request of the UE 106, wherein the at least one reject mode incudes one of, a protected reject mode and an unprotected reject mode.

In an embodiment, wherein the first network 102 is further configured to:
determine the protected reject mode for rejecting the registration request of the UE 106, on determining that the network selection mode of the UE 106 is the automatic mode and checking the at least one criteria corresponding to the automatic mode, wherein the at least one criteria corresponding to the automatic mode includes at least one of, a check performed to determine if an allowed list of second networks 104 for the UE 106 is updated, and an updated time of last allowed list of second networks 104 for the UE 106; and determine the unprotected reject mode for rejecting the registration request of the UE 106, on determining that the network selection of the UE 106 is the manual mode and checking the at least one criteria corresponding to the manual mode, wherein the at least one criteria corresponding to the manual mode includes one of, a frequency of reception of registration requests from the UE 106, and time of last successful authentication of the UE 106.

In an embodiment, wherein the first network 102 is further configured to reject the registration request of the UE 106 in the protected reject mode by:

performing a primary authentication procedure and establishing a Non-Stratum Access (NAS) security context with the UE 106; and sending a reject message and the allowed list of second networks 104 to the UE 106 over the established NAS security context with the UE 106.

In an embodiment, wherein the first network 102 is further configured to reject the registration request of the UE 106 in the unprotected reject mode by sending the reject message to the UE 106, before establishing the NAS security context with the UE 106.

In an embodiment, wherein the first network 102 is further configured to: performing the primary authentication of the UE 106, if the permissions of the UE 106 to access the second network 104 are verified; and enabling the UE 106 to access the second network 104, based on the primary authentication of the UE 106.

In an embodiment, wherein the first network 102 is further configured to: manage a subsequent handover of the UE 106 by performing one of: determining at least one target cell for the subsequent handover of the UE 106 based on the network selection mode of the UE 106; and providing the identifier of the second network 104 to a third network based on the network selection mode of the UE 106, wherein the third network determines at least one target cell for the subsequent handover of the UE 106, based on the at least one of the selected identifier of the second network (104) and the selection mode of the UE 106, wherein the third network includes one of, the second network 104, and at least one network other than the second network 104.

In an embodiment according to the present disclosure, a Public Land Mobile Network (PLMN) 102 in a wireless communication system 100 comprising: a Radio Access Network (RAN) 102a; and a Core Network 102b coupled to the RAN 102a configured to: receive a registration request of a User Equipment (UE) 106 for an access to a network 104, wherein the registration request includes a network selection mode of the UE 106, and an identifier indicating the network 104; verify permissions of the UE 106 to access the network 104; and determine at least one reject mode based on the network selection mode of the UE 106 for rejecting the registration request of the UE 106, if the permissions of the UE 106 to access the second network 104 are not verified.

In an embodiment, wherein the PLMN 102 includes one of, a Home PLMN (HPLMN), and a serving Visited PLMN (VPLMN), wherein the network 104 includes one of, at least one Closed Access Group (CAG) cell of a Non-Public Network (NPN), and/or a VPLMN.

In an embodiment, wherein one of a unified data management (UDM) 506, an access and mobility management function (AMF) 502, an authentication server function (AUSF) 504 of the CN 102b is configured to determine the reject mode for rejecting the registration request of the UE 106.

In an embodiment, The PLMN 102, wherein the CN 102b is further configured to: determine the network selection mode of the UE 106 from the received registration request, if the permissions of the UE 106 to access the second network 104 are not verified; check at least one criteria associated with the determined network selection mode of the UE 106; and determine the at least one reject mode based on the determined network selection mode and the checked at least one criteria for rejecting the registration request of the UE 106, wherein the at least one reject mode incudes one of, a protected reject mode and an unprotected reject mode.

In an embodiment, wherein the CN 102b is further configured to:

determine the protected reject mode for rejecting the registration request of the UE 106, on determining that the network selection mode of the UE 106 is the automatic mode and checking the at least one criteria corresponding to the automatic mode, wherein the at least one criteria corresponding to the automatic mode includes at least one of, a check performed to determine if an allowed list of second networks 104 for the UE 106 is updated, and an updated time of last allowed list of second networks 104 for the UE 106; and determine the unprotected reject mode for rejecting the registration request of the UE 106, on determining that the network selection of the UE 106 is the manual mode and checking the at least one criteria corresponding to the manual mode, wherein the at least one criteria corresponding to the manual mode includes one of, a frequency of reception of registration requests from the UE 106, and time of last successful authentication of the UE 106.

In an embodiment, wherein the CN 102b is further configured to perform one of:

performing a primary authentication procedure for establishing a Non-Stratum Access (NAS) security context with the UE 106 and sending a reject message and the allowed list of second networks 104 to the UE 106 over the established the NAS security context with the UE 106, on determining the protected reject mode for rejecting the registration request of the UE 106; and rejecting the registration request of the UE 106 in the unprotected reject mode by sending the reject message to the UE 106, before establishing the NAS security context with the UE 106, on determining the unprotected reject mode for rejecting the registration request of the UE 106.

FIG. 2 depicts the wireless communication system 100 including the PLMN 102 and the NPN 104, according to embodiments as disclosed herein. Embodiments herein further explain by considering that the network 104 is the NPN/CAG cell 104 as an example, but it may be obvious to a person skilled in the art that the network 104 may be considered as the VPLMN 104.

As depicted in FIG. 2, the NPN 104 includes a non-public Radio Access Network (RAN)/CAG cell(s) 202, and a non-public Core Network (CN) 204. The non-public RAN 202 referred herein may be 3GPP access nodes, non-3GPP access nodes, and so on. Examples of the 3GPP access nodes may be, but not limited to, evolved nodes (eNBs), New Radio nodes (gNBs), and so on. Examples of the non-3GPP access nodes may be, but is not limited to, a Local Access Network (LAN) node, a Wireless LAN (WLAN) node, a Wi-Fi node, and so on. The non-public RAN/CAG cell 202 may be configured to connect the at least one UE 106 to the non-public CN 204 (of the stand-alone NPN). The non-public CN 204 may be configured to connect the UE 106 to an external data network/PLMN 102. The non-public CN 204 may be at least one of an EPC network, a 5GC core network, and so on. Examples of the external data network can be, but not limited to, the Internet, a Packet Data Network (PDN), an Internet Protocol (IP) Multimedia Core Network Subsystem, and so on. In an embodiment, the NPN 104 (for example: the public network integrated NPN) may share the non-public RAN 202 with the PLMN 102. The NPN 104 and the PLMN 102 may include different identifiers (IDs), segregated spectrum bands, and functionalities of the CNs (for example, user plane and data plane functionalities of the CNs). In an embodiment, the NPN 104 may partially share the non-public RAN 202 with the PLMN 102, so that one or more of the functions of the non-public RAN 202 serving the NPN 104 may be provided by the PLMN 102. In an embodiment, the NPN 104 may share the non-public RAN 202 and the spectrum bands with the PLMN 102. In an embodiment, the NPN 104 may share the non-public RAN 202 and the control plane functionalities of the non-public CN 204 with the PLMN 102.

The PLMN 102 includes at least one cellular network/RAT comprising of at least one RAN 102a, and a CN 102b. The RAN 102a may be configured to connect the at least one UE 106 with the CN 102b. The RAN 102a may comprise of nodes/Base Stations (BSs) such as, but not limited to, evolved nodes (eNBs), New Radio nodes (gNBs), and so on. The RAN 102a may comprise of or more processors/Central Processing Units (CPUs), a memory, a transceiver, and so on, for performing at least one intended function/operation. The CN 102b referred herein may be at least one of an Evolved Packet Core (EPC), a 5G core (5GC) network, or the like. The CN 102b may be connected to the RAN 102a and the external data network. In an embodiment, the CN 102b may be connected to the non-public CN 204 over a Non-3GPP Inter-Working Function (N3IWF) interface. Embodiments herein use the terms such as "core network (CN)", "serving network", and so on interchangeably. The CN 102b may comprise of one or more processors/Central Processing Units (CPUs), a memory, a storage, a transceiver, and so on, for performing at least one intended function/operation.

The CN 102b may be configured to maintain information about at least one of NPN permissions of the UE 106, a subscription permanent identifier (SUPI) of the UE 106, the allowed list of CAG cells/CAG IDs configured for the UE 106, a mapping of the allowed list of CAG cells/NPNs 104 with the SUPI of the UE 106, the network selection mode of the UE 106, and so on. The allowed list of CAG cells 104 may be configured for the UE 106 based on the valid NPN permissions of the UE 106. The allowed list of CAG cells may include information about the CAG IDs of the CAG cells/NPNs 104, which the UE 106 may access. The SUPI may be a unique identifier that is allocated to the UE 106 by the PLMN 102, on performing a Universal Subscriber Identity Module (USIM) registration process by the UE 106 to register with the PLMN 102. The SUPI may be either an International Mobile Subscriber Identifier (IMSI) (as specified in TS 23. 503) or a Network Access Identifier (NAI) (as specified in TS 23.0003), and so on. The CN 102b may be configured to connect the at least one UE 106 (connected with the at least one RAN node 102a) to the external data network. The CN 102b may also be configured to enable the UE(s) 106 to access the CAG cells/NPNs 104 by verifying the permissions of the UE 106 to access the CAG cells/NPNs 104. In an embodiment, the CN 102b may verify the permissions of the UE 106 to access the NPN 104, before performing a primary authentication procedure of the UE 106. The CN 102b may perform the primary authentication procedure of the UE 106 according to 3GPP specification TS 23. 502.

As depicted in FIG. 2, the UE 106 may select the CAG cell of the NPN 104 for accessing the communication services (as a part of an initial access procedure) provided by the NPN 104. On selecting the CAG cell, the UE 106 sends the registration request to the RAN 202 of the selected NPN 104. The registration request includes at least one of the network selection mode, a subscribed concealed identifier (SUCI) of the UE 106, the CAG-ID of the selected CAG cell/NPN 104, or the like. The SUCI may be a privacy preserving identifier containing a concealed SUPI. In an example, the UE 106 may generate the SUCI using an Elliptic Curve Integrated Encryption Scheme (ECIES)-based protection scheme with a public key of the home network/HPLMN 102 that was securely provisioned to the UE 106 during the USIM registration. The UE 106 may send the registration request to the RAN 202 in an initial Non-Access Stratum (NAS) message, or any NAS message (for example, Identity Response message, or the like). On receiving the registration message from the UE 106, the RAN 202 sends the registration request to the CN 102b of the PLMN 102. In an embodiment, the RAN 202 may also receive the CAG ID of the selected CAG cell/NPN 104 from the UE 106.

On receiving the registration request of the UE 106 from the RAN 202, the CN 102b verifies if the UE 106 has the permissions to access the selected CAG cell/NPN 104. For verifying the permissions, the CN 102b reveals/de-conceals the received SUCI to the SUPI (as specified in 3GPP TS. 23.501). The CN 102b retrieves the allowed list of CAG cells/CAG IDs for the UE 106 based on the revealed SUPI. The CN 102b uses the maintained mapping of the allowed list of CAG cells with the SUPI of the UEs 106 and retrieves the allowed list of CAG cells for the revealed SUPI. The CN 102b checks if the received CAG ID of the selected CAG cell/NPN 104 is present in the retrieved allowed list of cells/CAG IDs for the UE 106. On checking that the received CAG ID of the selected CAG cell/NPN 104 is present in the retrieved allowed list of cells/CAG IDs for the UE 106, the CN 102b verifies that the UE 106 has the permission to access the selected CAG cell/NPN 104 (a successful verification). On verifying that the UE 106 has the valid NPN permissions to access the requested NPN 104 via the PLMN 102, the CN 102b performs the primary authentication procedure to authenticate the UE 106 and enables the UE 106 to access the selected CAG cell/NPN 104, if the primary authentication procedure is successful.

On checking that the received CAG ID of the selected CAG cell/NPN 104 is not present in the retrieved allowed list of cells/CAG IDs for the UE 106, the CN 102b verifies that the UE 106 does not have the permissions to access the selected CAG cell/NPN 104 (an unsuccessful verification). On verifying that the UE 106 does not have the permissions to access the selected CAG cell/NPN 104, the CN 102b determines the reject mode to reject the registration request of the UE 106. For determining the reject mode, the CN 102b determines the network selection mode (the automatic mode or the manual mode) of the UE 106 that has been indicated in the registration request included in the received registration request. The CN 102*b* checks the criteria corresponding to the determined network selection mode for determining the reject mode. Examples of the criteria associated with the manual mode may be, but not limited to, the frequency of the registration requests received from the UE 106, the time of last successful authentication of the UE 106, and so on. Examples of the criteria associated with the manual mode may be, but not limited to, if the permissions of the UE 106 to access the selected network 104 have been updated/modified/revised, the updated/provisioned/modified/revised time of the permissions of the UE 106, and so on. Based on the determined network selection mode and the checked criteria corresponding to the determined network selection mode, the CN 102*b* determines the reject mode. The reject mode includes the protected reject mode or the unprotected reject mode.

Embodiments herein consider the network selection mode and the criteria associated with the network selection mode as example parameters for determining the reject mode, but it may be obvious to a person skilled in the art that any other parameters in individual or in combination can be considered for determining the reject mode.

In an example, the CN 102*b* determines the protected mode for rejecting the registration request of the UE 106, if the network selection mode includes the automatic mode, and/or the permissions (i.e., the allowed list of CAG cells) of the UE 106 have not been modified from a long period, and/or the updated time of the permissions of the UE 106 indicates recent time period, or the like. The CN 102*b* may select the protected reject mode for rejecting the registration request of the UE 106, by considering that the automatic mode may not select the correct CAG cell/NPN 104 for the UE 106. On determining the protected reject mode for rejecting the registration request of the UE 106, the CN 102*b* performs the primary authentication procedure (as specified in the 3GPP specification TS 23. 502) and establishes the NAS security context with the UE 106 using an NAS security mode command procedure. The CN 102*b* sends the reject message and the allowed list of CAG cells/NPNs 104 to the UE 106 over the established NAS security context.

In an example, the CN 102*b* determines the unprotected mode for rejecting the registration request of the UE 106, if the CAG selection mode includes the manual mode, and/or the frequency of received registration request is very high, and/or the time of last successful authentication indicates much later time period, or the like. On determining the unprotected mode for rejecting the registration request of the UE 106, the CN 102*b* communicates the reject message to the UE 106 without performing the primary authentication procedure. The reject message indicates that the UE 106 does not have the permissions to access the requested CAG cell/NPN 104.

In an embodiment, the CN 102*b* may also configured to handle the handover of the UE 106 from one CAG cell/NPN 104 to another based on the network selection mode of the UE 106.

The CN 102*b* may receive the network selection mode of the UE 106 in the registration request (that includes the network selection mode and the identifier of the selected NPN 104 (CAG ID)) and store the received network selection mode of the UE 106. Alternatively, the CN 102*b* may receive the network selection mode and the CAG ID of the selected NPN 104 from the UE 106 separately over the NAS message or the AS message. The CN 102*b* may also receive the network selection mode of the UE 106 and the CAG ID of the NPN 104 from the RAN 202 over an N2 message and store the received network selection mode of the UE 106. The CN 102*b* may store the network selection mode of the UE 106 for handling the handover procedures of the UE 106. In an example herein, the handover procedure may involve a handover of the UE 106 from one CAG cell to another CAG cell.

During the handover procedure of the UE 106, the CN 102*b* may forward the stored network selection mode and the CAG ID of the CAG cell/NPN 104 that has been selected by the UE 106 using the stored network selection mode to the non-public RAN 202. The non-public RAN 202 selects the target CAG cell 202 of the NPN 104 for the UE 106 for the handover, based on the stored network selection mode of the UE 106. The RAN 202 enables the UE 106 to handover from the serving CAG cell/network to the selected target CAG cell. In an example herein, if the network selection mode is the manual mode, the RAN 202 may select the CAG cell of the NPN 104 with the same CAG ID that has been selected by the UE 106 using the manual mode. In another example herein, if the network selection mode is the automatic mode, the RAN 202 may select the NPN/CAG cell of the NPN 104, having the highest signal strength compared to other CAG cells that are available for the handover of the UE 106.

During the N2 based handover procedure of the UE 106, the CN 102*b* may select the target NPN 104 for the UE 106 based on the permissions of the UE 106 towards the NPN 104 and communicates the stored network selection mode of the UE 106 and the identifier of the selected NPN 104 (i.e., the CAG ID of the NPN 104) to the selected target NPN 104. The target NPN 104 selects the CAG cell for the UE 106 based on the network selection mode of the UE 106 and the CAG-ID of the NPN 104 and enables the UE 106 to handover to the selected CAG cell for accessing the communication service. In an example herein, if the network selection mode is the manual mode, the target NPN 104 may be the same NPN that has been selected by the UE 106 using the manual mode and the CAG cell selected for the UE 106 may belong to the target NPN 104. In another example herein, if the network selection mode is the automatic mode, the target NPN 104 may be the target NPN having the highest signal strength, compared to the other NPNs available for the handover of the UE 106.

FIG. 3 depicts the wireless communication system 100 including the PLMN 102 and the VPLMN 104, according to embodiments as disclosed herein. Embodiments herein further explain by considering that the network 104 is the VPLMN 104 as an example, but it may be obvious to a person skilled in the art that the network 104 may be considered as the NPN 104.

As depicted in FIG. 3, the PLMN 102 includes the RAN 102*a* and the CN 102*b* (as described in FIG. 2). The CN 102*b* stores the roaming agreements/subscription details of the UE 106. The VPLMN 104 includes a VPLMN RAN 302 and a VPLMN CN 304. The VPLMN RAN 302 referred herein may be, but not limited to, evolved nodes (eNBs), New Radio nodes (gNBs), and so on. The VPLMN RAN 302 may be configured to connect the at least one UE 106 to the VPLMN CN 304. The VPLMN CN 304 may be configured to connect the UE 106 to the external data network/PLMN 102. The VPLMN CN 304 may be at least one of an EPC network, a 5GC core network, and so on. The VPLMN RAN 302 and the VPLMN CN 304 perform at least one function similar to the function performed by the RAN 102*a* and the CN 102*b* of the PLMN 102.

As depicted in FIG. 3, the UE 106 may select the VPLMN 104 for accessing the communication services (i.e., the private communication services), when the UE 106 roams to an area wherein the PLMN 102 may no longer serve the UE 106. On selecting the VPLMN 104, the UE 106 initiates the registration procedure for accessing the communication services provided by the VPLMN 104. The UE 106 sends the registration request/attach request to the VPLMN CN 304 (of the selected VPLMN 104) through the VPLMN RAN 302. The registration request includes at least one of the network selection mode, identifier indicating the selected VPLMN 104 (i.e., the PLMN ID of the VPLMN 104), or the like. The VPLMN CN 304 forwards the registration request of the UE 106 to the CN 102b of the PLMN 102.

On receiving the registration request from the UE 106, the CN 102b verifies if the UE 106 has the permissions to access the selected VPLMN 104 according to the roaming agreements. If the UE 106 has the permissions to access the selected VPLMN 104, the CN 102b enables the UE 106 to access the selected VPLMN 104.

If the UE 106 does not have the access to the selected VPLMN 104, the CN 102b determines the reject mode to reject the registration request of the UE 106. For determining the reject mode, the CN 102b determines the network selection mode (the automatic mode or the manual mode) of the UE 106 that has been indicated in the registration request. The CN 102b checks the criteria corresponding to the determined network selection mode for determining the reject mode. Examples of the criteria associated with the manual mode may be, but not limited to, the frequency of the registration requests received from the UE 106, the time of last successful authentication of the UE 106, and so on. Examples of the criteria associated with the manual mode may be, but not limited to, if the permissions of the UE 106 to access the selected network 104 have been updated/modified/revised, the updated/provisioned/modified/revised time of the permissions of the UE 106, and so on. Based on the determined network selection mode and the checked criteria corresponding to the determined network selection mode, the CN 102b determines the reject mode. The reject mode includes the protected reject mode or the unprotected reject mode. On determining the protected reject mode for rejecting the registration request of the UE 106, the CN 102b retrieves the list of VPLMNs 104/preferred VPLMNs 104, which the UE 106 may access. The CN 102b sends the reject message and the allowed list of VPLMNs 104 to the VPLMN CN 304. The VPLMN CN 304 forwards the received reject message and the allowed list of VPLMNs 104 to the UE 106. On determining the unprotected mode for rejecting the registration request of the UE 106, the CN 102b sends the reject message to the VPLMN CN 304. The VPLMN CN 304 forwards the received reject message to the UE 106. The reject message indicates that the UE 106 does not have the permissions to access the selected VPLMN 104.

In an embodiment, the CN 102b/VPLMN CN 304 may also configured to handle the handover of the UE 106 from one VPLMN to another based on the network selection mode of the UE 106.

The CN 102b/VPLMN CN 304 may receive the network selection mode of the UE 106 in the registration request and store the received network selection mode of the UE 106. Alternatively, the CN 102b/VPLMN CN 304 may receive the network selection mode from the UE 106 separately over the NAS message or the AS message and store the received network selection mode of the UE 106. The CN 102b/VPLMN CN 304 may store the network selection mode of the UE 106 for handling the handover procedures of the UE 106. In an example herein, the handover procedure may involve a handover of the UE 106 from the PLMN 102 to the VPLMN 104. In another example herein, the handover procedure may involve a handover of the UE 106 from the VPLMN 104 to another VPLMN.

During the handover procedure of the UE 106, the CN 102b/VPLMN CN 304 may provide the network selection mode of the UE 106 and the identifier of the VPLMN (the PLMN-ID) that has been selected by the UE 106 using the stored network selection mode to the RAN 102a/302. The RAN 102a/302 may select target cells for the UE 106 for the handover, based on the stored network selection mode of the UE 106 and the selected identifier/PLMN-ID. The RAN 102a/302 enables the UE 106 to handover to the selected target VPLMN 104. In an example, if the network selection mode of the UE 106 is the manual mode, the RAN 102a/302 may select the target cells of the VPLMN 104 selected by the UE 106 in the manual mode, for the handover of the UE 106. In another example, if the network selection mode of the UE 106 is the automatic mode, the RAN 102a/302 selects the VPLMN or cells of the VPLMN having the highest signal strength compared to the other VPLMNs available for the UE 106.

During the N2 based handover procedure of the UE 106, the CN 102b/CN 102b/VPLMN CN 304 may select the target VPLMN 104 for the UE 106 based on the roaming agreements of the UE 106 and communicates the stored network selection mode of the UE 106 to the selected VPLMN 104. The target VPLMN 104 selects the cell from one of its serving cells for the UE 106 based on the network selection mode of the UE 106 and enables the UE 106 to handover to the selected cell for accessing the communication service. Consider an example scenario, wherein the UE 106 initially has the permissions to access a PLMN-1 (i.e., the PLMN 102). The UE 106 roams and selects a PLMN-2 (the VPLM 104) from the PLMN-2 and the PLMN-3 (the VPLMN) available for the UE 106 in the roamed area using the manual mode or the automatic mode. In such a scenario, if the UE 106 has selected the PLMN-2 using the manual mode, the PLMN-1 selects the PLMN-2 as the target PLMN for the UE 106 and sends the network selection mode (i.e., the manual selection mode) and the identifier of the PLMN-2 to the PLMN-2. The PLMN-2 selects the PLMN-2 or the cells of the PLMN-2 or the EPLMN related to the PLMN-2 for the handover of the UE 106. If the UE 106 has selected the PLMN-2 using the automatic mode, the PLMN-1 selects the PLMN-3 as the target PLMN for the UE 106, as the PLMN-3 is having the highest signal strength compared to the PLMN-3.

FIGS. 1, 2, and 3 show exemplary blocks of the wireless communication system 100, but it is to be understood that other embodiments are not limited thereon. In other embodiments, the wireless communication system 100 may include less or more number of blocks. Further, the labels or names of the blocks are used only for illustrative purpose and does not limit the scope of the embodiments herein. One or more blocks can be combined together to perform same or substantially similar function in the wireless communication system 100.

FIG. 4 is an example block diagram depicting various components of the CN 102b of the PLMN 102 for controlling the permissions of the UE 106 to access the network 104, according to embodiments as disclosed herein. The CN 102b includes a memory 402, a communication interface 404, and UE management modules 406.

The memory 402 may store information related to at least one of, but not limited to, the permissions of the UE 106 (for example: the NPN permissions, the permissions to access the CAG cells/NPNs 104, the roaming agreements, or the like), information related to the registration requests of the UE 106, the reject modes used for rejecting the registration requests of the UE 106, and so on. In an example, the information related to the registration requests of the UE 106 may be, but not limited to, the previous registration requests of the UE 106, the frequency of reception of the registration requests, the time of the authentication of the UE 106, the time of updating the allowed list of CAG cells for the UE 106, and so on. The memory 402 may also include one or more computer-readable storage media. The memory 402 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory 402 is non-movable. In certain examples, a non-transitory storage medium may store data that can, over time, change (e.g., in Random Access Memory (RAM) or cache). Also, the memory 402 may be at least one of, a database, a cloud storage, a storage server, and so on.

The communication interface 404 may be configured to enable the CN 102b of the PLMN 102 to communicate with at least one of, the UE(s) 106, the networks 104, and so on, over the interface supported by the corresponding PLMN 102. Examples of the interface may be, but is not limited to, an air interface, an N3IWF interface, and so on.

The UE management modules 406 may be core functional modules that depend on a type of the PLMN 102. In an example, consider that the PLMN 102 includes an LTE/4G network. In such a scenario, the CN 102b may be an EPC and the UE management modules 406 may include a Mobility Management Entity (MME), a serving gateway (S-GW), and a packet gateway (P-GW). In another example, consider that the PLMN 102 includes a NR/5G network. In such a scenario, the CN 102b may be a 5GC network and the UE management modules 406 include an access and mobility management function (AMF)/security anchor function (SEAF), an authentication server function (AUSF) and a unified data management (UDM)/an authentication credential Repository (ARPF)/subscription identifier revealing function (SIRF). The UE management modules 406 may also include other core functional modules (not shown).

One of the UE management modules 406 may be configured to control the permissions of the UE 106 to access the network 104. In an example, if the CN 102b is the 5GC network, then one of the AMF, the AUSF, and the UDM may be configured to control the permissions of the UE 106 to access the network 104.

The UE management module 406 may receive the registration request from the UE 106 for the access to the selected network 104. The registration request may include the network selection mode, the parameters indicating the selected network 104. In an example, if the selected network 104 is the CAG cell/NPN 104, the parameters may include the SUCI of the UE 106, the CAG ID of the selected CAG cell/NPN 104. In another example, if the selected network 104 is the VPLMN 104, the PLMN-ID of the selected VPLMN 104.

On receiving the registration request from the UE 106, the UE management module 406 checks if the UE 106 has the permissions to access the selected network 104, based on the parameters included in the registration request and the stored permissions of the UE 106. If the UE 106 has the permissions to access the selected network 104, the UE management module 406 performs the authentication procedure to check if the UE 106 is an authenticated UE or not and enables the UE 106 to access the selected network 104, if the UE is the authenticated UE. In an example, the UE management module 406 may perform the authentication procedure according to 3GPP TS 23.502 specification, if the selected network 104 is the NPN/CAG cell 104. In another example, the UE management module 406 may perform the authentication procedure according to 3GPP specification TS 23.502, if the selected network 104 is the VPLMN 104.

If the UE 106 does not have the permissions to access the selected network 104, the UE management module 406 rejects the registration request of the UE 106. The UE management module 406 determines the reject mode to notify the UE 106 about the rejection of the registration request. The UE management module 406 determines the network selection mode indicated in the received registration request and checks the criteria associated with the determined network selection mode. Based on the determined network selection mode and the checked associated criteria, the UE management module 406 determines the reject mode for notifying the UE 106 about the rejection of the registration request of the UE 106. The reject mode includes the protected reject mode or the unprotected reject mode.

In the protect reject mode, the UE management module 406 establishes the NAS security context with the UE 106 and sends the reject message and the allowed list of networks 104 for the UE 106 over the established NAS security context. In the unprotected reject mode, the UE management module 406 sends the reject mode to the UE 106 without establishing the NAS security context. Thus, signalling overhead between the CN 102b of the PLMN 102 and the UE 106 may be reduced.

The UE management module 406 may also be configured to store the network selection mode of the UE 106 in the memory 402. The UE management module 406 may receive the network selection mode as the part of the registration request from the UE 106. Also, the UE management module 406 may receive the network selection mode over the NAS message or the AS message. The UE management module 406 may forward the identifier of the selected NPN/VPLMN 104 selected by the UE 106 using the stored network selection mode to the RAN 202/302. The RAN 202/302 selects the target cells based on the received identifier of the NPN/VPLMN 104 for the future handover of the UE 106.

FIG. 4 shows exemplary blocks of the CN 102b of the PLMN 102, but it is to be understood that other embodiments are not limited thereon. In other embodiments, the CN 102b may include less or more number of blocks. Further, the labels or names of the blocks are used only for illustrative purpose and does not limit the scope of the embodiments herein. One or more blocks can be combined together to perform same or substantially similar function in the CN 102b.

FIG. 5A is an example block diagram of the PLMN 102 configured for controlling the permissions of the UE 106 to access the network 104 and selecting the target CAG cell 104 for the UE 106 for the handover based on the network selection mode of the UE 106, wherein the CN 102b of the PLMN 102 is a 5GC network and the network 104 is the CAG cell/NPN 104, according to embodiments as disclosed herein. Embodiments herein are further explained by considering that the PLMN 102 includes a 5G network, but it may be obvious to a person skilled in the art that any other cellular networks/RATs may be considered.

As depicted in FIG. 5A, the PLMN/5G network 102 includes the RAN 102a and the CN 102b. The RAN 102a may be a NR RAN/gNB 102 and the CN 102b may be a 5GC network 102b. The 5GC network 102b includes an AMF/SEAF 502, an AUSF 504, and a UDM/ARPF/SIDF 506.

The AMF/SEAF 502 may be configured to support functions such as, but not limited to, termination of NAS signaling, NAS ciphering and integrity protection, registration management, connection management, mobility management, access authentication and authorization, security context management, and so on. The AUSF 504 may be an authentication server configured to authenticate the UEs 106 by maintaining information about the UEs 106. The UDM/ARPF/SIDF 506 may be configured to perform functions such as, but not limited to, generation of authentication and key agreement (AKA) credentials, user identification handling, access authorization, subscription management, and so on. In an embodiment herein, the UDM, the ARPF, and the SIDF may or may not operate mutually to perform the at least one function.

Embodiments herein enable at least one of the UDM 506, the UDM/ARPF/SIDF 506, the AUSF 504, and the AMF/SEAF 502 to control the permissions of the UE 106 to access the selected network 104. The network 104 is the NPN 104.

Embodiments herein further explain by considering that the UDM 506 controls the permissions of the UE 106 to access the CAG cell/NPN 104. The UE 106 may select the CAG cell/NPN 104 for accessing the specific communication services provided by the CAG cell/NPN 104. On selecting the CAG cell/NPN 104, the UE 106 sends the registration request to the non-public RAN/new (NG)-RAN 202 (an example of the non-public RAN 202), as a part of the registration procedure, for accessing the selected CAG cell/NPN 104. The registration request includes the network selection mode, the CAG ID of the selected CAG cell/NPN 104, and the SUCI of the UE 106. The NG-RAN 202 forwards the received registration request of the UE 106 to the AMF 502.

The AMF 502 includes the received SUCI of the UE 106, the CAG ID of the selected CAG cell/NPN 104, and the network selection mode in an authentication request message (Nausf_UEAuthentication_Authenticate request message). The AMF 502 sends the authentication request message to the AUSF 504. The AUSF 504 derives the SUCI of the UE 106, the CAG ID of the selected CAG cell/NPN 104, and the network selection mode from the received authentication request message. The AUSF 504 inserts the SUCI of the UE 106, the CAG ID of the selected CAG cell/NPN 104, and the network selection mode in an authentication get request message (Nudm_UEAuthentication_Get_Request message). The AUSF 504 sends the authentication get request message to the UDM 506.

On receiving the authentication get request message, the UDM 506 authorizes/verifies if the UE 106 has the permissions to access the selected CAG cell/NPN 104. For verifying the permissions, the UDM 506 reveals/de-conceals the received SUCI to the SUPI (as specified in 3GPP TS 23.501). The UDM 506 retrieves the allowed list of CAG cells/CAG IDs for the UE 106 based on the revealed SUPI. The UDM 506 uses the maintained mapping of the allowed list of CAG cells with the SUPI of the UEs 106 to retrieve the allowed list of CAG cells/IDs for the revealed SUPI. The UDM 506 checks if the received CAG ID of the selected CAG cell/NPN 104 is present in the retrieved allowed list of cells/CAG IDs for the UE 106. On checking that the received CAG ID of the requested CAG cell/NPN 104 is present in the retrieved allowed list of cells/CAG IDs for the UE 106, the UDM 506 verifies that the UE 106 has the permissions to access the CAG cell/NPN 104. On verifying that the UE 106 has the permissions to access the selected CAG cell, the UDM 506 selects an authentication method, and generates an authentication vector (following procedures specified in 3GPP TS 23.501). The authentication vector may be used to perform the primary authentication procedure of the UE 106. The UDM 206 sends the generated authentication vector to the AMF 502 through the AUSF 504 to perform the primary authentication procedure. On receiving the authentication vector from the UDM 506, the AMF 502 authenticates the UE 106 and enables the UE 106 to access the selected CAG cell/NPN 104 on the successful authentication (according to 3GPP TS 23.502).

If the received CAG ID of the selected CAG cell/NPN 104 is not present in the retrieved allowed list of cells/CAG IDs for the UE 106, the UDM 506 verifies that the UE 106 does not have the permissions to access the selected CAG cell/NPN 104. On verifying that the UE 106 does not have the permissions to access the selected CAG cell/NPN 104, the UDM 506 rejects the registration request of the UE 106 and determines the reject mode to notify the UE 106 about the rejection of the registration request. For determining the reject mode, the UDM 506 checks if the network selection mode includes the automatic mode or the manual mode. If the network selection mode includes the automatic mode, the UDM 506 determines the protected reject mode as the reject mode for rejecting the registration request of the UE 106. If the CAG selection mode of the UE 106 includes the manual mode, the UDM 506 determines the unprotected reject mode as the reject mode for rejecting the registration request of the UE 106. In an embodiment, the UDM 506 may also consider the criteria (such as if the permission permissions of the UE 106 to access the CAG cells/allowed list of CAG cells have been updated/modified/revised, the frequency of the registration request, the time of last successful authentication of the UE 106, the updated/provisioned time of last allowed list of CAG cells for the UE 106, and so on) associated with the network selection mode for determining the reject mode.

On determining the protected reject mode for rejecting the registration request of the UE 106, the UDM 506 generates the authentication vector based on the SUCI even though the UE 106 does not have permission to access the selected CAG cell/NPN 102b. The UDM 506 inserts the authentication vector, the allowed list of CAG cells for the UE 106, and the reject message in the Nudm_UEAuthentication_Get Response message. The UDM 506 sends the Nudm_UEAuthentication_Get Response message to the AUSF 504. The AUSF 504 inserts the received authentication vector, the allowed list of CAG cells for the UE 106, and the CAG cell reject message in the Nausf_UEAUthentication_Authenticate response message and sends the Nausf_UEAUthentication_Authenticate response message to the AMF 502. On receiving the authentication vector, the AMF 502 performs the primary authentication procedure (as specific in 3GPP TS 23.502 specification) and establishes the NAS security context with the UE 106 by performing a NAS SMC (Security Mode Command) procedure. The AMF 502 then sends the received reject message and the allowed list of CAG cells/NPNs 104 to the UE 106. On receiving the allowed list of CAG cells/NPNs 104, and the reject message, the UE 106 determines the protected reject mode and moves the CAG ID of the requested CAG cell/NPN 104 to a forbidden list by performing a legacy procedure of multiple attempts.

On determining the unprotected reject mode for rejecting the registration request of the UE 106, the UDM 506 inserts the reject message in the Nudm_UEAuthentication_Get Response message without proceeding further to generate the authentication vector. The UDM 506 sends the Nudm_ UEAuthentication_Get Response message to the AUSF 504. The AUSF 504 inserts the CAG cell reject message in the Nausf_UEAUthentication_Authenticate response message and sends the Nausf_UEAUthentication_Authenticate response message to the AMF 502. On receiving the CAG cell reject message, the AMF 502 sends the received reject message to the UE 106. The reject message indicates the UE 106 that the UE 106 does not have the permissions to access the selected CAG cell/NPN 104.

Embodiments herein enable the AMF 502 of the 5GC 102b to verify the permissions of the UE 106 to access the selected CAG cells/NPN 104 and perform the signalling reduction procedure. As a part of the registration procedure, for accessing the selected CAG cell/NPN 104, the UE 106 sends the registration request including the SUCI, the network selection mode, and the CAG ID of the selected CAG cell/NPN 104 to the NG-RAN 202 of the selected NPN 104. The NG-RAN 202 forwards the received registration request to the AMF 502.

The AMF 502 sends the received SUCI of the UE 106 over the Nausf_UEAuthentication_Authenticate request message to the AUSF 504 for the SUPI of the UE 106. The AUSF 504 further forwards the received SUCI of the UE 106 to the UDM 506 over the Nudm_UEAuthentication_ Get_Request message for the SUPI of the UE 106. On receiving the SUCI of the UE 106, the UDM 506 reveals the SUCI of the UE 106 to the SUPI and derives the allowed list of CAG cells/IDs for the UE 106. The UDM 506 sends the SUPI and the allowed list of CAG cells/IDs 104 for the UE 106 to the AUSF 504 over the Nudm_UEAuthentication_ Get Response message. The AUSF 504 forwards the received SUPI and the allowed list of CAG cells/IDs to the AMF 502 over the Nausf_UEAUthentication_Authenticate response message.

Based on the received SUPI and the allowed list of CAG cells/IDs for the UE 106, the AMF 502 verifies if the UE 106 has the permissions to access the selected CAG cell/NPN 104. On verifying that the UE 106 has the permissions to access the requested CAG cell/NPN 104, the AMF 502 performs the primary authentication procedure (as specified in the 3GPP TS 23. 502 specification).

On determining that the UE 106 does not have the permissions to access the requested CAG cell/NPN 104, the AMF 502 determines the mode under which the registration request of the UE 106 has been rejected. The AMF 502 checks if the CAG selection mode includes the automatic mode or the manual mode. If the network selection mode includes the automatic mode, the AMF 502 checks the criteria associated with the automatic mode. Based on the determined automatic mode and the checked associated criteria, the AMF 502 determines the protected reject mode for rejecting the registration request of the UE 106. In the protected reject mode, the AMF 502 establishes the NAS security context with the UE 106 and sends the reject message to the UE 106 over the established NAS security context. If the network selection mode includes the manual mode, the AMF 502 checks the criteria associated with the manual mode. Based on the determined manual mode and the checked associated criteria, the AMF 502 determines the unprotected reject mode for rejecting the registration request of the UE 106. In the unprotected reject mode, the AMF 502 sends the reject message to the UE 106 without establishing the NAS security context with the UE 106.

Embodiments herein enable the AMF 502 to store the network selection mode of the UE 106 for handling the future handovers of the UE 106.

The AMF 502 may store the network selection mode of the UE 106 that has been indicated in a NAS request message received from the UE 106. The NAS request message includes one of the registration request, an initial NAS message, NAS security mode complete or the like. Alternatively, the UE 106 sends the network selection mode in the AS/RRC message to the RAN 202. The RRC/AS message includes one of a RRCSetupComplete, AS security mode complete, or the like. Then the RAN 202 provides the network selection mode of the UE to the AMF 502, in a N2AP procedure (for example, Initial UE Message). Alternatively, the AMF 502 may explicitly receive an indication about the network selection mode of the UE 106 from the UDM 506. The AMF 502 stores the network selection mode of the UE 106. The AMF 502 indicates at least one of the CAG ID of the CAG cell selected by the UE 106 and the stored network selection mode to the NG-RAN 202. The NG-RAN 202 appropriately selects the target cells 104 for the future handover of the UE 106. The target cells may be the CAG cells being served by the network 104 selected by the UE 106.

Alternatively, in the N2 based handover procedure, the AMF 502 forwards at least one of the CAG ID selected by the UE 106 and the network selection mode to an AMF of the target network (which is another second network 104) selected for the handover of the UE. The AMF of the target network forwards at least one of the CAG ID selected by the UE 106 and the received network selection mode to a NG-RAN of the target network. The NG-RAN selects the target CAG cells for future handover of the UE 106 based on at least one of the received, CAG ID and the network selection mode. For example, the NG-RAN selects the best CAG cell (i.e., having the highest signal strength) from the allowed CAG list considering the signal strength to handover the UE 106, if the network selection mode is automatic. If the network selection mode is manual, then the NG-RAN sticks to the user selected CAG ID, even though signal strength is not good comparatively. If the network selection mode is manual and there is no suitable cell (same CAG ID), then the NG-RAN may obtain consent from the UE to handover to another CAG ID.

FIG. 5B is an example block diagram of the PLMN 102 configured for controlling the permissions of the UE 106 to access the network 104, wherein the CN 102b of the PLMN 102 is a 5GC network and the network 104 is the VPLMN 104, according to embodiments as disclosed herein. Embodiments herein are further explained by considering that the PLMN 102 includes a 5G network, but it may be obvious to a person skilled in the art that any other cellular networks/RATs may be considered.

As depicted in FIG. 5B, the PLMN/5G network 102 includes the RAN 102a and the CN 102b. The RAN 102a may be a new/NG RAN/gNB 102a and the CN 102b may be a 5GC network 102b. The 5GC network 102b includes an UDM 506 coupled with a Home Subscriber Server (HSS) 508. The HSS may be configured to store the roaming agreements of the UE 106 and provide the information of the VPLMN (i.e., preferred or non-preferred VPLMN) selected by the UE 106.

Embodiments herein enable the UDM 506 coupled with the HSS 508 to control the permissions of the UE 106 to access the selected VPLMN 104. The UDM 506 receives the registration request of the UE 106 from the CN 304 of the selected VPLMN 104. The registration request includes the network selection mode and the PLMN-ID of the selected VPLMN 104. On receiving the registration request, the UDM 506 determines the selected VPLMN 104 from the parameters included in the registration request and requests the HSS 508 to provide information about the selected VPLMN 104. The HSS 508 provides information about the selected VPLMN 104 to the UDM 506 according to the roaming agreements of the UE 106, wherein the information may indicate if the UE 106 has the access to the selected VPLMN 104 or not. If the UE 106 has the permissions to access the selected VPLMN 104, the UDM 506 enables the UE 106 to access the selected VPLMN 104 by performing the primary authentication procedure of the UE 106.

If the UE 106 does not have the permissions to access the selected VPLMN 104, the UDM 506 determines the reject mode to reject the registration request of the UE 106. The UDM 506 determines the reject mode based on the network selection mode of the UE 106 and the criteria corresponding to the determined network selection mode. In an example herein, the UDM 506 determines the protected reject mode, on determining that the network selection mode of the UE 106 is the automatic mode and checking the criteria corresponding to the automatic mode. In the protected reject mode, the UDM 506 sends the reject message and the allowed/preferred list of VPLMNs 104 to the UE 106 through the selected VPLMN 104 by performing the primary authentication procedure of the UE 106. In another example herein, the UDM 506 determines the unprotected reject mode, on determining that the network selection mode of the UE 106 is the manual mode and checking the criteria corresponding to the manual mode. In the unprotected reject mode, the UDM 506 sends the reject message to the UE 106 through the selected VPLMN 104.

Embodiments herein enable the AMF 502 to store the network selection mode of the UE 106 to handle the future handover of the UE 106.

The AMF 502 receives the network selection mode from the UE 106 in a NAS request message received from the UE 106. The NAS request message includes one of the registration request, an initial NAS message, NAS security mode complete or the like. Alternatively, the UE 106 sends the network selection mode in the AS/RRC message to the RAN 302 of the selected VPLMN 104. The RRC/AS message includes one of a RRCSetupComplete, AS security mode complete, or the like. Then the RAN 302 provides the network selection mode of the UE to the AMF 502, in a N2AP procedure (for example, Initial UE Message). Alternatively, the AMF 502 may receive an indication about the network selection mode of the UE 106 from the UDM 506 as a part of a Nudm service interface (for example: as a part of an access and mobility subscription data). Alternatively, the AMF 502 may receive an indication about the network selection mode of the UE 106 from the RAN 302 in an N2 message (for example: in an initial UE message). The RAN 302 may store the network selection mode of the UE 106 based on information provided by the UE 106 in an RRC message. The information may include at least one of, the network selection mode, the identifier indicating the selected network or cell, and so on.

The AMF 502 indicates at least one of the identifier of the selected VPLMN (PLMN-ID of the selected VPLMN 104) by the UE 106 and the stored/received network selection mode to the RAN 302 in an initial context setup request message. The RAN 302 selects the target cells for the future handover of the UE 106, based on at least one of the stored/received network selection mode and the identifier of the selected VPLMN.

Alternatively, for the N2 based handover procedure, the AMF 502 forwards the PLMN-ID of the selected VPLMN 104 to an AMF of the target network (which has been selected for the handover of the UE 106, which is another second network 104). The AMF of the target network forwards the received PLMN-ID to a NG-RAN of the target second network. The NG-RAN selects the target cells of the VPLMN for future handover of the UE 106 based on the received PLMN-ID. For example, the NG-RAN selects the best second network (i.e., having the highest signal strength) considering the signal strength to handover the UE 106, if the network selection mode is automatic. If the network selection mode is manual, then the NG-RAN sticks to the user selected PLMN ID, even though signal strength is not good comparatively. If the network selection mode is manual and there is no suitable cell if the user selected PLMN ID, then the NG-RAN may get consent from the UE to handover to another PLMN.

FIG. 6 is a sequence diagram depicting verification of the permissions of the UE 106 to access the CAG cell using the signaling reduction procedure, according to embodiments as disclosed herein. At step 602, the UE 106 sends the registration request to the CN 102b of the PLMN 102 for access to the NPN/CAG cell, via the RAN 202 of the selected NPN 104. The registration request includes the SUCI of the UE 106, the network selection mode and optionally the CAG ID of the requested CAG cell/NPN 104.

At step 604, the CN 102b verifies if the UE 106 has the permissions to access the requested/selected/RAN broadcasted CAG cell(s) 202. The CN 102b reveals the received SUCI to the SUPI of the UE 106 and derives the allowed list of CAG cells/NPNs 104 for the UE 106. The CN 102b uses the allowed list of CAG cells/NPNs 104 for the UE 106 and the CAG ID of the selected/RAN broadcasted CAG cell(s) and verifies if the UE 106 has the permissions to access the selected CAG cell.

On verifying that the UE 106 has the permissions to access the requested CAG cell, at step 606, the CN 102b performs the primary authentication procedure to enable the UE 106 to access the selected CAG cell.

On determining that the UE 106 does not have the permissions to access the requested CAG cell, at step 608a, the CN 102b performs the signaling reduction procedure. The signaling reduction procedure involves rejecting the registration request of the UE 106 to access the selected CAG cell in at least one of the protected mode or the unprotected mode. The CN 102b determines the protected reject mode or the unprotected reject mode based on the network selection mode and the criteria such as, but not limited to, if the permissions of the UE 106 to access the CAG cells/allowed list of CAG cells is modified/updated, the frequency of the registration request, the time of last successful authentication of the UE 106, the updated/provisioned time of last allowed list of CAG cells for the UE 106, and so on.

On determining the protected reject mode for rejecting the registration request of the UE 106, at step 608b, the CN 102b sends the reject message and the allowed list of CAG cells/IDs to the UE 106 after establishing the NAS security context with the UE 106.

On determining the unprotected reject mode for rejecting the registration request of the UE 106, at step 608c, the CN 102b sends the reject message before establishing the NAS security context established with the UE 106.

FIG. 7 is an example flow diagram depicting a method for verifying the permissions of the UE 106 to access the CAG cell/NPN 104 and performing the signaling reduction procedure based on the network selection mode of the UE 106, according to embodiments as disclosed herein. At step 702, the UE 106 sends the SUCI, optionally the CAG ID of the selected CAG cell, and the network selection mode to the CN 102b of the PLMN 102 requesting the access to the selected CAG cell 202.

At step 704, the CN 102b checks if the network selection mode of the UE 106 is the automatic mode or the manual mode. At step 706a, on checking that the network selection mode is the automatic mode, the CN 102b verifies/authorizes the permissions of the UE 106 to access the requested CAG cell of the NPN 104. If the permissions of the UE 106 have not been verified, the CN 102b sends the reject message and the allowed list of CAG cells/NPNs 104 to the UE 106 in the protected reject mode. If the permissions of the UE 106 to access the selected CAG cell/NPN 104 have been verified successfully, the CN 102b performs the primary authentication procedure to enable the UE 106 to access the selected CAG cell 202.

At step 706b, on checking that the network selection mode is the manual mode, the CN 102b verifies the permissions of the UE 106 to access the requested CAG cell/NPN 104 and sends the reject message to the UE 106 in the unprotected reject mode, if the permissions of the UE 106 have not been verified. If the permissions of the UE 106 to access the requested CAG cell/NPN 104 have been verified successfully, the CN 102b performs the primary authentication procedure to enable the UE 106 to access the selected CAG cell.

At step 708, the UE 106 determines if it has received the reject message in the protected reject mode or the unprotected reject mode. The UE 106 determines the reject mode based on the received allowed list of CAG cells/NPNs 104, the establishment of the NAS security context with the CN 102b, presence of message authentication code and so on. At step 710a, the UE 106 moves the CAG ID of the requested CAG cell to a blacklist/forbitten list by performing the legacy procure of multiple attempts on determining that it has received the reject message in the unprotected mode. At step 710b, the UE 106 updates its allowed list of CAG cells based on the received allowed CAG lists from the CN 102b, on determining that it has received the reject message in the protected mode.

FIG. 8 is a sequence diagram depicting the signaling reduction procedure performed at the UDM 506 of the CN 102b, according to embodiments as disclosed herein. At step 801, the UE 106 sends the registration request including the SUCI, the network selection mode and optionally the CAG ID of the selected CAG cell to the AMF 502 through the NG-RAN 202 of the selected NPN 104. At step 802, the AMF 502 sends the SUCI, the network selection mode, and if included by the UE the CAG ID of the selected CAG cell or the NG-RAN 202 provided CAG ID(s) it broadcasting to the AUSF 504 over the Nausf_UEAuthentication_Authenticate request message. At step 803, the AUSF 504 sends the SUCI, the network selection mode, and the CAG ID(s) provided by the UE and/or by the RAN of the selected CAG cell/NPN 104 to the UDM 506 over the Nudm_UEAuthentication_Get_Request message.

At step 804, the UDM 506 verifies if the UE 106 has the permissions to access the requested CAG cell/NPN 104 using the CAG ID of the selected/accessing CAG cell (provided by the UE or by the RAN), and the allowed list of CAG cells for the UE 106 (derived by revealing the SUCI of the UE 106 to the SUPI). The UDM 506 further checks the network selection mode of the UE 106 to proceed further based on the verification results.

At step 805a, the UDM 506 generates and sends the authentication vector to the AMF 502, if the UE 106 has the permissions to access the selected CAG cell/NPN 104 and the network selection mode of the UE 106 is the manual mode. At step 805b, the AMF 502 performs the primary authentication procedure as specified in the 3GPP TS 23.502 specification.

At step 806a, the UDM 506 generates and sends the authentication vector to the AMF 502, if the UE has the permissions to access the requested CAG cell/NPN 104 and the network selection mode of the UE 106 is the automatic mode. At step 806b, the AMF 502 performs the primary authentication procedure as specified in the 3GPP TS 23.502 specification.

At step 807a, the UDM 506 sends the authentication vector to the AMF 502, if the UE does not have the permissions to access the selected CAG cell and the CAG selection mode of the UE 106 is the automatic mode. At step 807b, the AMF 502 performs the primary authentication procedure as specified in the 3GPP TS 23.502 specification. At step 807c, the AMF 502 establishes the NAS security context with the UE 106 by performing the NAS SMC procedure. At step 807d, the AMF 502 sends the reject message and the allowed list of CAG cells to the UE 106 in the protected reject mode.

At step 808a, the UDM 506 sends the reject message to the AMF 502, if the UE 106 does not have the permissions to access the requested CAG cell/NPN 104 and the network selection mode of the UE 106 is the manual mode. At step 808b, the AMF 502 sends the reject message to the UE 106 in the unprotected reject mode.

FIG. 9 is a sequence diagram depicting the signaling reduction procedure performed at the AMF 502 of the CN 102b, according to embodiments as disclosed herein. At step 901, the UE 106 sends the registration request including the SUCI, the network selection mode and optionally the CAG ID of the selected CAG cell to the AMF 502 through the NG-RAN 202.

At step 902, the AMF 502 sends the SUCI to the AUSF 504 over the Nausf_UEAuthentication_Authenticate request message. At step 903, the AUSF 504 sends the SUCI, to the UDM 506 over the Nudm_UEAuthentication_Get_Request message.

At step 904, the UDM 506 reveals the SUCI of the UE 106 to the SUPI and derives the allowed list of CAG cells/NPNs 104 for the UE 106. The UDM 506 sends the SUPI and the derived allowed list of CAG cells/NPNs 104 to the AMF 502. The AMF 502 performs the primary authentication procedure as specified in the 3GPP TS 23.502 specification. The AMF 502 verifies if the UE 106 has the permissions to access the requested CAG cell/NPN 104 using the allowed list of CAG cells for the UE 106 and the CAG ID of the requested CAG cell/NPN 104. If the UE 106 has the permissions to access the requested CAG cell/NPN 104, then the AMF 502 follows reset of the procedures as defined in TS 23.502.

At step 905, the AMF 502 determines the reject mode to reject the registration request of the UE 106, if the UE 106 does not have the permissions to access the requested CAG cell/NPN 104. The reject mode may be determined based on the network selection mode of the UE 106 and the criteria associated with the network selection mode.

At step 906a, the AMF 502 determines the protected reject mode as the reject mode for rejecting the registration request of the UE 106, if the network selection mode includes the automatic mode. At step 906b, the AMF 502 establishes the NAS security context with the UE 106 by performing the NAS SMC procedure, on determining the protected reject mode for rejecting the registration request of the UE 106. At step 906c, the AMF 502 sends the reject message and the allowed list of CAG cells/NPNs 104 to the UE 106 in the protected reject mode.

At step 907a, the AMF 502 determines the unprotected reject mode as the reject mode for rejecting the registration request of the UE 106, if the network selection mode includes the manual mode. At step 907b, the AMF 502 sends the reject message to the UE 106 in the unprotected reject mode.

FIG. 10 is a sequence diagram depicting selection of the target CAG cells 104 based on the network selection mode for the handover of the UE, according to embodiments as disclosed herein.

At step 1001, the AMF 502 receives and stores the network selection mode of the UE 106. The AMF 502 receives the network selection mode from the UE 106 in the NAS message (for example, NAS message being registration request, NAS Security Mode Complete) (1101a). Also, the AMF 502 explicitly receives the indication about the network selection mode of the UE 106 from the UDM 506 (1101b).

At step 1002a, the AMF 502 indicates at least one of the CAG ID of the CAG cell/NPN 104 selected by the UE 106 and the stored network selection mode to the NG-RAN 202 of the selected NPN 104. At step 1002b, the NG-RAN 202 appropriately selects the target cells 104 for the future handover of the UE 106. The target cells may be the CAG cells being served by the network/NPN 104 selected by the UE 106.

In case of the N2 based handover procedure, at step 1003a, the AMF 502 forwards at least one of the CAG ID selected by the UE 106 and the stored network selection mode to the AMF of the target network selected for the handover of the UE. At step 1003b, the AMF of the target network forwards at least one of the received CAG ID and the network selection mode to the NG-RAN of the target network. At step 1003c, the NG-RAN selects the target CAG cells for future handover of the UE 106 based on at least one of the received CAG ID and the network selection mode.

FIG. 11 is a sequence diagram depicting a handover of the UE by selecting a VPLMN based on the network selection mode of the UE, according to embodiments as disclosed herein.

At step 1101, the AMF 502 receives and stores the network selection mode of the UE 106. The AMF 502 receives the network selection mode from the UE 106 in at least one of, the registration request, the initial NAS message, NAS Security Mode Complete, the RRCSetupComplete then Initial UE Message, AS security mode complete then Initial UE Message, and so on (1101a). Also, the AMF 502 receives the network selection mode of the UE 106 from the UDM 506 and the NG-RAN 302 (an example of the VPLMN RAN 302) in a message supported by the Nudm service interface and the N2 message (1101b and 1101c) respectively.

At step 1102a, the AMF 502 indicates at least one of the identifier of the selected VPLMN 104 (PLMN-ID of the selected VPLMN 104) by the UE 106 and the stored/received network selection mode to the NG-RAN 302 of the selected VPLMN 104. At step 1102b, the NG-RAN 302 selects the target cells for the future handover of the UE 106.

In case of the N2 based handover procedure, at step 1103a, the AMF 502 forwards at least one of the PLMN-ID of the selected VPLMN 104 and network selection mode to the AMF of the target network (which has been selected for the handover of the UE 106). At step 1103b, the AMF of the target network forwards at least one of the received PLMN-ID and the network selection mode to a NG-RAN of the target network. At step 1103c, the NG-RAN selects the target cells of the VPLMN for future handover of the UE 106 based on at least one of the received PLMN-ID and the network selection mode.

The embodiments disclosed herein can be implemented through at least one software program running on at least one hardware device and performing network management functions to control the elements. The elements shown in FIGS. 1-5b, can be at least one of a hardware device, or a combination of hardware device and software module.

FIG. 12 schematically illustrates the base station according to embodiments of the present disclosure.

The gNBs, eNBs or BSs described above may correspond to the base station 1200. For example, the base station 1200 may include in the PLMN 102. For example, the base station 1200 may include in the NPN 104 or the VPLMN 104.

Referring to the FIG. 12, the Base station 1200 may include a processor 1210, a transceiver 1220 and a memory 1230. However, all of the illustrated components are not essential. The Base station 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the Base station 1200 may be implemented by the processor 1210.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the Base station 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

FIG. 13 illustrates a user equipment (UE) according to embodiments of the present disclosure.

The UE described above may correspond to the UE 1300. For example, the UE 106 may correspond to the UE 1300.

Referring to the FIG. 13, the UE 1300 may include a processor 1310, a transceiver 1320 and a memory 1330.

However, all of the illustrated components are not essential. The UE 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the UE 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the UE 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

FIG. 14 illustrates a network function (NF) according to embodiments of the present disclosure.

In an embodiment, the NF 1400 may correspond to NF in the CN 102b of PLMN 102. The NF may correspond to NF in the non-public CN 204 of NPN 104. The NF 1400 may correspond to NF in the VPLMN CN 304 of NPN 104. For example, the NF 1400 may correspond to a unified data management (UDM) 506, an access and mobility management function (AMF) 502, an authentication server function (AUSF) 504 of the CN 102b. Also, the NF 1400 may correspond to HSS+UDM 508. However, the NF is not limited to the above-described entity.

Referring to the FIG. 14, the NF 1400 may include a processor 1410, a transceiver 1420 and a memory 1430. However, all of the illustrated components are not essential. The NF 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The processor 1410 may include one or more processors or other processing devices that control the proposed function, process, and/or method. Operation of the NF 1400 may be implemented by the processor 1410.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the NF 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

The embodiments disclosed herein describe methods and systems for controlling permissions of a UE for accessing a network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for controlling permissions of a User Equipment (UE) to access at least one network, the method comprising:
receiving, by a first network, a registration request for access to a second network including at least one of a network selection mode of the UE and an identifier indicating a second network, from the UE;
verifying, by the first network, permissions of the UE to access the requested second network; and
determining, by the first network, reject mode for rejecting the registration request of the UE based on the network selection mode of the UE, if the permissions of the UE to access the second network are not verified,
wherein the network selection mode of the UE includes one of an automatic mode, and a manual mode, and
wherein the reject mode includes one of a protected reject mode, and an unprotected reject mode.

2. The method of claim 1,
wherein the first network includes a Public Land Mobile Network (PLMN), and
wherein the PLMN is at least one of a home PLMN (HPLMN) and a serving Visited PLMN (VPLMN).

3. The method of claim 1, wherein the second network includes one of, at least one Closed Access Group (CAG) cell of a Non-Public Network (NPN), a serving network of the PLMN, and a VPLMN.

4. The method of claim 1, wherein:
the network selection mode is a mode using which the UE has selected the second network for accessing at least one communication service;
the identifier includes a CAG identifier (CAG ID) of the at least one CAG cell of a NPN, if the second network includes the at least one CAG cell of the NPN; and
the identifier includes a PLMN identifier (PLMN-ID) indicating a VPLMN, if the second network includes the VPLMN.

5. The method of claim 1, wherein verifying, by the first network, the permissions of the UE to access the second network, wherein the second network includes at least one CAG cell of a NPN, includes:
receiving a subscription concealed identifier (SUCI) from the UE in the registration request;
revealing the received SUCI of the UE to a subscription permanent identifier (SUPI);
deriving an allowed list of CAG IDs for the UE based on the SUPI;
determining if the received CAG ID of the at least one CAG cell of a NPN in the registration request is present in a retrieved allowed list of CAG IDs;
determining that the permissions of the UE to access the at least one CAG cell of the NPN are verified, if the received CAG ID of the at least one CAG cell is present in the retrieved allowed list of CAG IDs; and
determining that the permissions of the UE to access the at least one CAG cell of the NPN are not verified, if the received CAG ID of the at least one CAG cell is not present in the retrieved allowed list of CAG IDs.

6. The method of claim 1, wherein determining, by the first network, the reject mode includes:
determining the network selection mode of the UE from the received registration request, if the permissions of the UE to access the second network are not verified;
checking at least one criteria associated with the determined network selection mode of the UE; and
determining the reject mode based on the determined network selection mode and the checked at least one criteria for rejecting the registration request of the UE.

7. The method of claim 6, wherein:
the protected reject mode for rejecting the registration request of the UE is determined, on determining that the network selection mode of the UE is the automatic mode and checking the at least one criteria corresponding to the automatic mode, wherein the at least one criteria corresponding to the automatic mode includes at least one of, a check performed to determine if an allowed list of second network for the UE is updated, and an updated time of last allowed list of second networks for the UE; and
the unprotected reject mode for rejecting the registration request of the UE is determined, on determining that the network selection of the UE is the manual mode and checking the at least one criteria corresponding to the manual mode, wherein the at least one criteria corresponding to the manual mode includes one of, a frequency of reception of registration requests from the UE, and time of last successful authentication of the UE.

8. The method of claim 7, wherein rejecting the registration request in the protected reject mode includes:
performing a primary authentication procedure;
establishing a Non-Stratum Access (NAS) security context with the UE; and
transmitting a reject message and the allowed list of second networks to the UE over the established NAS security context with the UE.

9. The method of claim 7, wherein rejecting the registration request in the unprotected reject mode includes transmitting the reject message to the UE, before establishing the NAS security context with the UE.

10. The method of claim 1, further comprising one of:
performing a primary authentication of the UE, if the permissions of the UE to access the second network are verified; and
enabling the UE to access the second network, based on the primary authentication of the UE.

11. The method of claim 1, further comprising:
managing, by the first network, a handover of the UE by performing one of:
determining, by the first network, at least one target cell for the handover of the UE based on the network selection mode of the UE; and
providing, by the first network, the identifier of the second network to a third network based on the network selection mode of the UE, wherein the third network determines at least one target cell for the handover of the UE, based on the at least one of the selected identifier of the second network and the selection mode of the UE, wherein the third network includes one of, the second network, and at least one network other than the second network.

12. A Public Land Mobile Network (PLMN) in a wireless communication system comprising:
a Radio Access Network (RAN); and
a Core Network (CN) coupled to the RAN configured to:
receive a registration request of a User Equipment (UE) for an access to a network, wherein the registration request includes at least one of a network selection mode of the UE, and an identifier indicating the network;

verify permissions of the UE to access the network; and
determine reject mode for rejecting the registration request of the UE based on the network selection mode of the UE, if the permissions of the UE to access the network are not verified,
wherein the network selection mode of the UE includes one of an automatic mode, and a manual mode, and
wherein the reject mode includes one of a protected reject mode, and an unprotected reject mode.

13. The PLMN of claim 12,
wherein one of a unified data management (UDM), an access and mobility management function (AMF), an authentication server function (AUSF) of the CN is configured to determine the reject mode for rejecting the registration request of the UE.

14. The PLMN of claim 12, wherein the CN is further configured to:
determine the network selection mode of the UE from the received registration request, if the permissions of the UE to access the network are not verified;
check at least one criteria associated with the determined network selection mode of the UE; and
determine the reject mode based on the determined network selection mode and the checked at least one criteria for rejecting the registration request of the UE.

\* \* \* \* \*